US012267449B2

(12) United States Patent
Bertin et al.

(10) Patent No.: US 12,267,449 B2
(45) Date of Patent: Apr. 1, 2025

(54) HANDHELD ELECTRONIC DEVICE

(71) Applicant: Apple Inc., Cupertino, CA (US)

(72) Inventors: James A. Bertin, San Jose, CA (US); Jaden A. Barney, East Palo Alto, CA (US); Matthew W. Miller, Cupertino, CA (US); Robert Ward, Cupertino, CA (US); Kurtis J. Mundell, Cupertino, CA (US); Garrett R. Owoc, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 177 days.

(21) Appl. No.: 17/835,887

(22) Filed: Jun. 8, 2022

(65) Prior Publication Data

US 2023/0283701 A1    Sep. 7, 2023

Related U.S. Application Data

(60) Provisional application No. 63/316,333, filed on Mar. 3, 2022.

(51) Int. Cl.
*H04M 1/02* (2006.01)
*G06F 1/16* (2006.01)

(52) U.S. Cl.
CPC ........ *H04M 1/0266* (2013.01); *G06F 1/1626* (2013.01); *G06F 1/1656* (2013.01); *H04M 1/0262* (2013.01)

(58) Field of Classification Search
CPC .... H04M 1/02; H04M 1/0202; H04M 1/0249; H04M 1/026; H04M 1/0262;
(Continued)

(56) References Cited

U.S. PATENT DOCUMENTS

| 4,769,680 A | 9/1988 | Resor, III et al. |
| 5,032,007 A | 7/1991 | Silverstein et al. |

(Continued)

FOREIGN PATENT DOCUMENTS

| CN | 102759814 | 10/2012 |
| CN | 102981295 | 3/2013 |

(Continued)

OTHER PUBLICATIONS

"LCD with Embedded Camera for Picture Telephone," IBM Corporation Research Disclosure 42572, Sep. 1999.

*Primary Examiner* — Siu M Lee
(74) *Attorney, Agent, or Firm* — Brownstein Hyatt Farber Schreck, LLP

(57) ABSTRACT

A mobile phone may include a housing structure and a front cover assembly coupled to the housing structure and positioned over the battery. The front cover assembly may include a transparent cover defining at least a portion of a front exterior surface of the mobile phone and a display assembly coupled to the transparent cover and including a display element configured to produce graphical outputs visible through the transparent cover, a first conductive display cowling below a first region of the display element, and a second conductive display cowling below a second region of the display element and spaced apart from the first conductive display cowling, thereby forming a gap between the first conductive display cowling and the second conductive display cowling. The mobile phone may further include a battery positioned below the gap.

23 Claims, 11 Drawing Sheets

(58) Field of Classification Search
CPC . H04M 1/0266; H04M 1/0277; G06F 1/1626; G06F 1/1656; G06F 1/1637; G06F 1/1658
See application file for complete search history.

(56) References Cited

U.S. PATENT DOCUMENTS

| | | |
|---|---|---|
| 5,358,412 A | 10/1994 | Maurinus et al. |
| 5,359,206 A | 10/1994 | Yamamoto et al. |
| 5,481,430 A | 1/1996 | Miyagawa et al. |
| 5,539,550 A | 7/1996 | Spitzer et al. |
| 5,572,343 A | 11/1996 | Okamura et al. |
| 5,623,392 A | 4/1997 | Ma |
| 5,631,753 A | 5/1997 | Hamaguchi et al. |
| 5,678,483 A | 10/1997 | Johnson |
| 5,708,561 A | 1/1998 | Huilgol et al. |
| 5,739,800 A | 4/1998 | Lebby et al. |
| 5,748,270 A | 5/1998 | Smith |
| 5,760,858 A | 6/1998 | Hodson et al. |
| 5,851,411 A | 12/1998 | An et al. |
| 5,889,568 A | 3/1999 | Seraphim et al. |
| 5,940,153 A | 8/1999 | Castaneda et al. |
| 5,965,916 A | 10/1999 | Chen |
| 5,988,827 A | 11/1999 | Lee et al. |
| 5,990,986 A | 11/1999 | Song et al. |
| 6,104,461 A | 8/2000 | Zhang et al. |
| 6,177,214 B1 | 1/2001 | Yokoyama et al. |
| 6,278,504 B1 | 8/2001 | Sung |
| 6,335,773 B1 | 1/2002 | Kamei et al. |
| 6,429,057 B1 | 8/2002 | Hong et al. |
| 6,462,806 B2 | 10/2002 | Zhang et al. |
| 6,483,719 B1 | 11/2002 | Bachman |
| 6,525,786 B1 | 2/2003 | Ono |
| 6,532,152 B1 | 3/2003 | White |
| 6,570,757 B2 | 5/2003 | DiFonzo et al. |
| 6,583,439 B2 | 6/2003 | Yamazaki et al. |
| 6,646,689 B2 | 11/2003 | Matsuda |
| 6,776,497 B1 | 8/2004 | Huppi et al. |
| 6,842,211 B2 | 1/2005 | Katsura |
| 6,919,678 B2 | 7/2005 | Ozolins et al. |
| 6,940,564 B2 | 9/2005 | Murden et al. |
| 6,977,808 B2 | 12/2005 | Lam et al. |
| 7,013,558 B2 | 3/2006 | Bachman |
| 7,035,090 B2 | 4/2006 | Tanaka et al. |
| 7,092,066 B2 | 8/2006 | Matsuda |
| 7,110,059 B2 | 9/2006 | Zhang |
| 7,133,104 B2 | 11/2006 | Kim et al. |
| 7,161,185 B2 | 1/2007 | Yamazaki et al. |
| 7,188,965 B2 | 3/2007 | Chang et al. |
| 7,217,588 B2 | 5/2007 | Hartzell et al. |
| 7,227,185 B2 | 6/2007 | Lin |
| 7,237,941 B2 | 7/2007 | Hsieh et al. |
| 7,245,333 B2 | 7/2007 | Nam et al. |
| 7,253,869 B1 | 8/2007 | Russell et al. |
| 7,271,871 B2 | 9/2007 | Jen et al. |
| 7,282,380 B2 | 10/2007 | Maruyama et al. |
| 7,286,173 B2 | 10/2007 | Zhang et al. |
| 7,420,608 B2 | 9/2008 | Yamasaki |
| 7,425,749 B2 | 9/2008 | Hartzell et al. |
| 7,443,460 B2 | 10/2008 | Park |
| 7,468,774 B2 | 12/2008 | Sakama |
| 7,489,291 B2 | 2/2009 | Yamazaki et al. |
| 7,505,436 B2 | 3/2009 | English |
| 7,522,236 B2 | 4/2009 | Gettemy et al. |
| 7,525,629 B2 | 4/2009 | Konuma et al. |
| 7,528,912 B2 | 5/2009 | Zhang et al. |
| 7,551,358 B2 | 6/2009 | Lee et al. |
| 7,569,410 B2 | 8/2009 | Hartzell et al. |
| 7,582,904 B2 | 9/2009 | Fujii et al. |
| 7,585,121 B2 | 9/2009 | Tsai |
| 7,586,565 B2 | 9/2009 | Kao |
| 7,618,683 B2 | 11/2009 | Tsuchimura |
| 7,629,613 B2 | 12/2009 | Sohn et al. |
| 7,663,607 B2 | 2/2010 | Hotelling et al. |
| 7,697,092 B2 | 4/2010 | Yi et al. |
| 7,728,906 B2 | 6/2010 | Bilbrey |
| 7,728,937 B2 | 6/2010 | Kume et al. |
| 7,736,936 B2 | 6/2010 | Tanaka |
| 7,764,335 B2 | 7/2010 | Tanaka et al. |
| 7,790,487 B2 | 9/2010 | Shih et al. |
| 7,800,707 B2 | 9/2010 | Hsieh et al. |
| 7,812,920 B2 | 10/2010 | Lino |
| 7,813,042 B2 | 10/2010 | Mather et al. |
| 7,821,561 B2 | 10/2010 | Tsuboi |
| 7,829,391 B2 | 11/2010 | Okada et al. |
| 7,830,370 B2 | 11/2010 | Yamazaki et al. |
| 7,852,440 B2 | 12/2010 | Kunimori et al. |
| 7,859,606 B2 | 12/2010 | Higaki et al. |
| 7,868,957 B2 | 1/2011 | Yamazaki et al. |
| 7,883,232 B2 | 2/2011 | Bang |
| 7,894,021 B2 | 2/2011 | Yang et al. |
| 7,898,585 B2 | 3/2011 | Nam |
| 7,903,206 B2 | 3/2011 | Nakamura et al. |
| 7,907,230 B2 | 3/2011 | Goto et al. |
| 7,924,362 B2 | 4/2011 | Slobodin |
| 7,929,046 B2 | 4/2011 | Okamura |
| 7,929,075 B2 | 4/2011 | Lee |
| 7,933,123 B2 | 4/2011 | Wang et al. |
| 7,936,346 B2 | 5/2011 | Kunimori et al. |
| 7,995,183 B2 | 8/2011 | Yamazaki et al. |
| 8,004,629 B2 | 8/2011 | Miyata |
| 8,013,454 B2 | 9/2011 | Yamashita et al. |
| 8,018,558 B2 | 9/2011 | Kubota |
| 8,033,708 B2 | 10/2011 | Tsubaki |
| 8,049,221 B2 | 11/2011 | Komori |
| 8,059,231 B2 | 11/2011 | Kim |
| 8,130,354 B2 | 3/2012 | Kimura |
| 8,149,279 B2 | 4/2012 | Guo |
| 8,154,679 B2 | 4/2012 | Kim |
| 8,194,138 B2 | 6/2012 | Shen |
| 8,199,294 B2 | 6/2012 | Hakoi et al. |
| 8,199,477 B2 | 6/2012 | Mathew et al. |
| 8,203,677 B2 | 6/2012 | Sakai |
| 8,248,559 B2 | 8/2012 | Morita |
| 8,253,875 B2 | 8/2012 | Kim |
| 8,253,890 B2 | 8/2012 | Zhong et al. |
| 8,274,814 B2 | 9/2012 | Tokunaga et al. |
| 8,350,985 B2 | 1/2013 | Hasegawa |
| 8,369,702 B2 | 2/2013 | Sanford et al. |
| 8,395,722 B2 | 3/2013 | Mathew et al. |
| 8,408,780 B2 | 4/2013 | Mathew et al. |
| 8,456,586 B2 | 6/2013 | Mathew et al. |
| 8,467,177 B2 | 6/2013 | Mathew et al. |
| 8,492,246 B2 | 7/2013 | Dairiki et al. |
| 8,508,495 B2 | 8/2013 | Hotelling et al. |
| 8,556,444 B2 | 10/2013 | Kim et al. |
| 8,558,977 B2 | 10/2013 | Gettemy et al. |
| 8,576,332 B2 | 11/2013 | Chang |
| 8,649,165 B2 | 2/2014 | Lin et al. |
| 8,711,304 B2 | 4/2014 | Mathew et al. |
| 8,731,618 B2 | 5/2014 | Jarvis et al. |
| 8,743,309 B2 | 6/2014 | Mathew et al. |
| 8,749,496 B2 | 6/2014 | Chang et al. |
| 8,767,141 B2 | 7/2014 | Mathew et al. |
| 8,786,557 B2 | 7/2014 | Noguchi et al. |
| 8,866,989 B2 | 10/2014 | Mathew et al. |
| 8,912,990 B2 | 12/2014 | Vieri et al. |
| 9,466,246 B1 | 10/2016 | Jalava et al. |
| 9,541,965 B1 | 1/2017 | Mukherjee et al. |
| 9,811,188 B1 | 11/2017 | Subbarayan et al. |
| 9,900,999 B1 * | 2/2018 | Lim ............... H04R 1/025 |
| 10,288,973 B1 | 5/2019 | Gupta et al. |
| 11,632,448 B2 | 4/2023 | Baker et al. |
| 11,637,919 B2 | 4/2023 | Baker et al. |
| 12,003,657 B2 | 6/2024 | Koch et al. |
| 2004/0095526 A1 | 5/2004 | Yamabuchi et al. |
| 2004/0212555 A1 | 10/2004 | Falco |
| 2005/0052737 A1 | 3/2005 | Amemiya et al. |
| 2005/0264689 A1 | 12/2005 | Yang et al. |
| 2005/0266591 A1 | 12/2005 | Hideo |
| 2006/0125982 A1 | 6/2006 | Lin et al. |
| 2006/0138296 A1 | 6/2006 | DeLuga |
| 2006/0148425 A1 | 7/2006 | Carlson |
| 2006/0176417 A1 | 8/2006 | Wu et al. |

(56) References Cited

U.S. PATENT DOCUMENTS

| | | |
|---|---|---|
| 2006/0223006 A1 | 10/2006 | Shimada et al. |
| 2006/0279652 A1 | 12/2006 | Yang |
| 2007/0002216 A1 | 1/2007 | Chang et al. |
| 2007/0126966 A1 | 6/2007 | Takahashi |
| 2007/0127194 A1 | 6/2007 | She |
| 2007/0188675 A1 | 8/2007 | Tsubokura et al. |
| 2007/0197677 A1 | 8/2007 | Tsuchimura et al. |
| 2007/0291172 A1 | 12/2007 | Kouzimoto et al. |
| 2008/0192171 A1 | 8/2008 | Azuma |
| 2008/0239754 A1 | 10/2008 | Kang et al. |
| 2008/0266469 A1 | 10/2008 | Chen et al. |
| 2009/0085848 A1 | 4/2009 | Huang et al. |
| 2009/0091673 A1 | 4/2009 | Chen et al. |
| 2009/0147179 A1 | 6/2009 | Yamashita et al. |
| 2009/0153762 A1 | 6/2009 | Kuwabara et al. |
| 2009/0257189 A1 | 10/2009 | Wang et al. |
| 2009/0257289 A1 | 10/2009 | Byeon et al. |
| 2009/0279284 A1 | 11/2009 | Takeuchi et al. |
| 2009/0286001 A1 | 11/2009 | Kanke et al. |
| 2010/0026656 A1 | 2/2010 | Hotelling et al. |
| 2010/0033647 A1 | 2/2010 | Okita et al. |
| 2010/0079942 A1 | 4/2010 | Yamamoto et al. |
| 2010/0097525 A1 | 4/2010 | Mino |
| 2010/0100202 A1 | 4/2010 | Chen et al. |
| 2010/0182538 A1 | 7/2010 | Takata |
| 2010/0207857 A1 | 8/2010 | Gu et al. |
| 2010/0225844 A1 | 9/2010 | Kamada |
| 2010/0302478 A1 | 12/2010 | Nakagawa et al. |
| 2010/0309102 A1 | 12/2010 | Jung |
| 2010/0321325 A1 | 12/2010 | Springer et al. |
| 2011/0001706 A1 | 1/2011 | Sanford et al. |
| 2011/0005662 A1 | 1/2011 | Sung |
| 2012/0020700 A1 | 1/2012 | Yamada |
| 2012/0050958 A1 | 3/2012 | Sanford et al. |
| 2012/0050975 A1 | 3/2012 | Garelli et al. |
| 2012/0050988 A1 | 3/2012 | Rothkopf et al. |
| 2012/0105400 A1 | 5/2012 | Mathew et al. |
| 2012/0106063 A1 | 5/2012 | Mathew et al. |
| 2012/0165072 A1 | 6/2012 | Griffin |
| 2012/0268667 A1 | 10/2012 | Paleczny et al. |
| 2013/0215642 A1 | 8/2013 | Mathew et al. |
| 2013/0250491 A1 | 9/2013 | Alakontiala et al. |
| 2013/0335899 A1 | 12/2013 | Wang et al. |
| 2014/0162736 A1 | 6/2014 | Shin et al. |
| 2014/0239781 A1 | 8/2014 | Allore et al. |
| 2014/0340824 A1 | 11/2014 | Chen et al. |
| 2015/0138710 A1 | 5/2015 | Mathew et al. |
| 2016/0011704 A1 | 1/2016 | Chiu et al. |
| 2016/0058375 A1 | 3/2016 | Rothkopf et al. |
| 2017/0013731 A1 | 1/2017 | Lee et al. |
| 2017/0311456 A1 | 10/2017 | Wang et al. |
| 2018/0042127 A1 | 2/2018 | Kim et al. |
| 2018/0234594 A1 | 8/2018 | Lim et al. |
| 2018/0288889 A1 * | 10/2018 | Fordham ............ H05K 5/0086 |
| 2018/0299924 A1 | 10/2018 | Seo et al. |
| 2019/0239375 A1 | 8/2019 | Lu et al. |
| 2020/0014415 A1 | 1/2020 | Lee et al. |
| 2020/0233380 A1 | 7/2020 | Rothkopf et al. |
| 2021/0167487 A1 | 6/2021 | Varma et al. |
| 2021/0168225 A1 | 6/2021 | Bates et al. |
| 2021/0168226 A1 | 6/2021 | Keen et al. |
| 2021/0168229 A1 | 6/2021 | Kallman et al. |
| 2023/0217613 A1 * | 7/2023 | Cho ..................... G06F 1/1652 |
| | | 361/807 |

FOREIGN PATENT DOCUMENTS

| | | | |
|---|---|---|---|
| CN | 103744486 | 4/2014 | |
| CN | 104160685 | 11/2014 | |
| CN | 206993173 | 2/2018 | |
| CN | 207992872 | 10/2018 | |
| CN | 108735098 | 11/2018 | |
| CN | 208723945 | 4/2019 | |
| JP | 00/330090 | 11/2000 | |
| JP | 01/117077 | 4/2001 | |
| JP | 04/135275 | 4/2004 | |
| JP | 05/176151 | 6/2005 | |
| JP | 09/015272 | 1/2009 | |
| JP | 2013011771 | 1/2013 | |
| JP | 2013051662 | 3/2013 | |
| KR | 100400714 | 9/2003 | |
| KR | 04/017693 | 2/2004 | |
| KR | 100809277 | 2/2008 | |
| KR | 1020080058911 | 6/2008 | |
| KR | 100856092 | 9/2008 | |
| KR | 1020080089908 | 10/2008 | |
| WO | WO08/120879 | 10/2008 | |
| WO | WO2012/106216 | 8/2012 | |
| WO | WO-2012106216 A2 * | 8/2012 | .......... G06F 1/1656 |
| WO | WO-2021251594 A1 * | 12/2021 | |

* cited by examiner

HANDHELD ELECTRONIC DEVICE

CROSS-REFERENCE TO RELATED APPLICATION(S)

This application is a nonprovisional patent application of and claims the benefit of U.S. Provisional Patent Application No. 63/316,333, filed Mar. 3, 2022 and titled "Handheld Electronic Device," the disclosure of which is hereby incorporated herein by reference in its entirety.

FIELD

The subject matter of this disclosure relates generally to handheld electronic devices and, more particularly, to mobile phones.

BACKGROUND

Modern consumer electronic devices take many shapes and forms, and have numerous uses and functions. Smartphones, for example, provide various ways for users to interact with other people, as well as to access information, work, play games, and so forth. Such devices may include numerous systems to facilitate such interactions. For example, a smartphone may include a touch-sensitive display for providing graphical outputs and for accepting touch inputs, wireless communications systems for connecting with other devices to send and receive voice and data content, cameras for capturing photographs and videos, and so forth.

SUMMARY

A mobile phone may include a housing structure and a front cover assembly coupled to the housing structure and positioned over the battery. The front cover assembly may include a transparent cover defining at least a portion of a front exterior surface of the mobile phone and a display assembly coupled to the transparent cover and including a display element configured to produce graphical outputs visible through the transparent cover, a first conductive display cowling below a first region of the display element, and a second conductive display cowling below a second region of the display element and spaced apart from the first conductive display cowling, thereby forming a gap between the first conductive display cowling and the second conductive display cowling. The mobile phone may further include a battery positioned below the gap, a circuit board assembly positioned below the front cover assembly, and a back cover coupled to the housing structure and defining at least a portion of a back exterior surface of the mobile phone.

The front cover assembly may further include a mounting frame, the first conductive display cowling may be fastened to the mounting frame, thereby structurally and conductively coupling the first conductive display cowling to the mounting frame, the second conductive display cowling may be fastened to the mounting frame, thereby structurally and conductively coupling the second conductive display cowling to the mounting frame, and the first conductive display cowling, the second conductive display cowling, and the mounting frame may be conductively coupled to a system ground of the mobile phone. The mounting frame may conductively couple the first conductive display cowling to the second conductive display cowling.

The gap may extend along an axis from an edge of the first conductive display cowling to an edge of the second conductive display cowling, the battery may be spaced apart from the edge of the first conductive display cowling along the axis, and the battery may be spaced apart from the edge of the second conductive display cowling along the axis. An entirety of the battery may be positioned below the gap.

The gap may be a first gap, and a second gap may be defined between a top surface of the battery and a bottom surface of the display element. The display assembly may further include a graphite layer defining at least a portion of the bottom surface of the display element. A second gap may be defined between a top surface of the circuit board assembly and a bottom surface of the display element, and the circuit board assembly may include a second graphite layer defining at least a portion of the top surface of the circuit board assembly. The display element may include a flexible circuit element extending from a side of the display element and conductively coupled to the circuit board assembly, and a portion of the flexible circuit element may be captured between the second conductive display cowling and a bottom surface of the display element.

A mobile phone may include a housing structure defining at least a portion of a side exterior surface of the mobile phone, a transparent cover coupled to the housing structure and defining at least a portion of a front exterior surface of the mobile phone, a display element coupled to the transparent cover and configured to produce graphical outputs visible through the transparent cover, a battery positioned below the display element and defining a top surface facing a bottom surface of the display element, a first conductive display cowling coupled to the transparent cover along an upper region of the display element and non-overlapping with the top surface of the battery, and a second conductive display cowling coupled to the transparent cover along a lower region of the display element and non-overlapping with the top surface of the battery.

The mobile phone may further include a conductive component coupled to the housing structure and conductively coupled to a system ground of the mobile phone, and the second conductive display cowling may be conductively coupled to the conductive component, thereby conductively coupling the cover assembly to the system ground. The mobile phone may further include a compliant conductive member positioned between the conductive component and the second conductive display cowling and conductively coupling the conductive component to the second conductive display cowling. The compliant conductive member may include a foam core and a conductive fabric extending around the foam core.

The mobile phone may further include a mounting frame coupled to the transparent cover and configured to retain the transparent cover to the housing structure. The first conductive display cowling may be conductively coupled to the mounting frame, the second conductive display cowling may be conductively coupled to the mounting frame, and the first conductive display cowling, the second conductive display cowling, and the mounting frame may be conductively coupled to a system ground of the mobile phone. The mobile phone may further include a polymer structure attached to the transparent cover, and the mounting frame may include a metal structure at least partially embedded in the polymer structure.

A mobile phone may include a housing structure at least partially defining an interior volume, a front cover assembly coupled to the housing structure and including a transparent cover, a display element configured to produce graphical outputs visible through the transparent cover, a first conductive structure overlapping a first region of a bottom surface of the display element and defining a first conductive path between the front cover assembly and a system ground of the mobile phone, and a second conductive structure overlapping a second region of the bottom surface of the display element and defining a second conductive path between the front cover assembly and the system ground of the mobile phone. The mobile phone may further include a battery coupled to the housing structure and positioned below a third region of the display element, the third region between the first region of the display element and the second region of the display element.

A top surface of the battery may be positioned across a gap from a bottom surface of the display element. The display element may include a graphite layer defining at least a portion of the bottom surface of the display element.

The mobile phone may further include a circuit board assembly coupled to the housing structure, and a portion of a top surface of the circuit board assembly may be positioned across a gap from a bottom surface of the display element. The circuit board assembly may include a graphite layer defining at least the portion of the top surface of the circuit board assembly.

The first conductive structure may be a first conductive display cowling that does not overlap the battery and the second conductive structure may be a second conductive display cowling that does not overlap the battery.

A mobile phone may include a housing structure, a battery, and a front cover assembly coupled to the housing structure and positioned over the battery. The front cover assembly may include a transparent cover defining at least a portion of a front exterior surface of the mobile phone, a display assembly coupled to the transparent cover and including a display element configured to produce graphical outputs visible through the transparent cover, a first conductive display cowling below a first region of the display element and positioned outside of an outer periphery of the battery, and a second conductive display cowling below a second region of the display element and positioned outside of the outer periphery of the battery. The mobile phone may further include a circuit board assembly positioned below the front cover assembly and a back cover coupled to the housing structure and defining at least a portion of a back exterior surface of the mobile phone.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Mobile phones as described herein may include complex, sophisticated components and systems that facilitate a multitude of functions. For example, mobile phones according to the instant disclosure may include touch- and/or force-sensitive displays, numerous cameras (including both front- and rear-facing cameras), GPS systems, haptic actuators, wireless charging systems, and all requisite computing components and software to operate these (and other) systems and otherwise provide the functionality of the mobile phones.

Figure 1A:
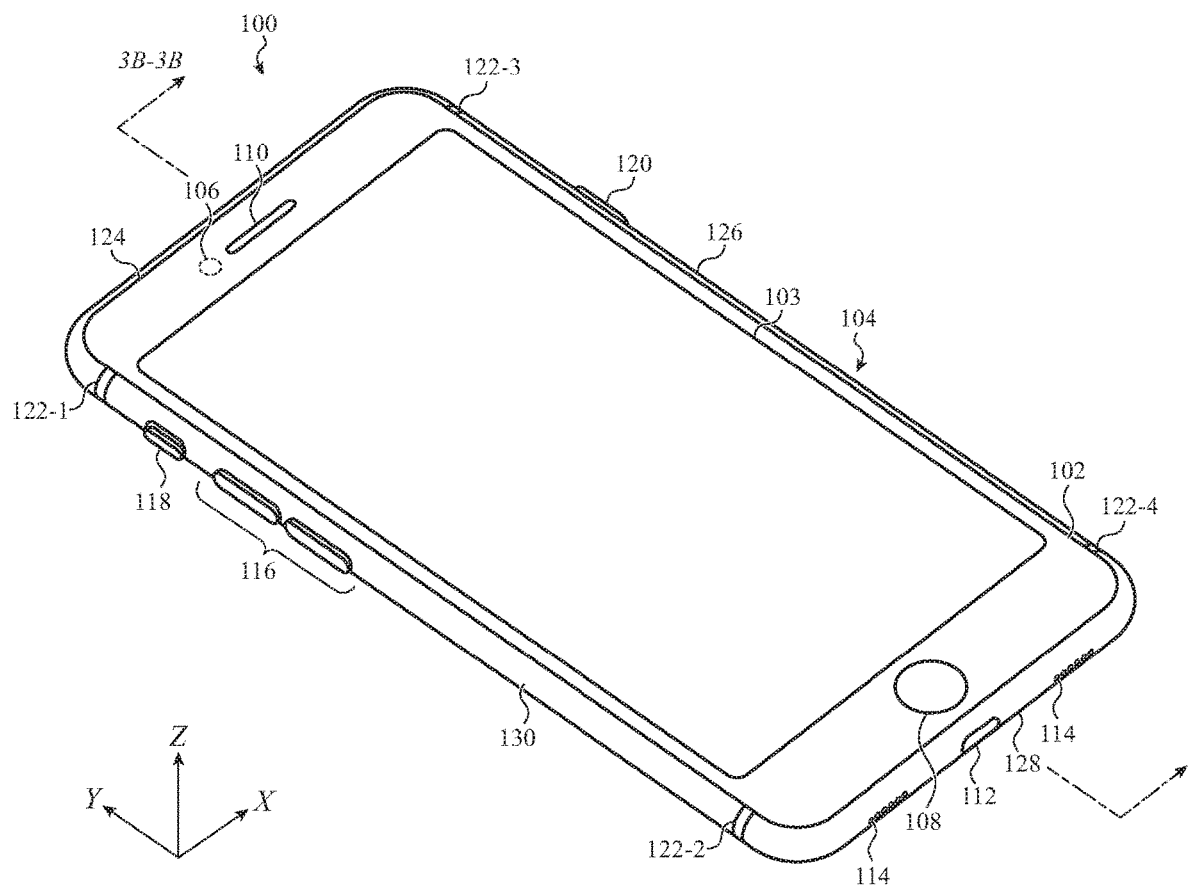
FIGS. 1A-1B depict an example electronic device.

FIG. 1A shows an example electronic device 100 embodied as a mobile phone. While the device 100 is a mobile phone, the concepts presented herein may apply to any appropriate electronic device, including wearable devices (e.g., watches), laptop computers, handheld gaming devices, tablet computers, computing peripherals (e.g., mice, touchpads, keyboards), or any other device. Accordingly, any reference to an "electronic device" encompasses any and all of the foregoing.

The electronic device 100 includes a transparent cover 102 (e.g., a front cover), such as a glass, plastic, or other substantially transparent material, component, or assembly, attached to a housing structure 104 (or simply "housing" 104). The transparent cover 102 (or simply "cover" 102) may be positioned over a display 103. The cover 102 may be formed from glass (e.g., a chemically strengthened glass), sapphire, ceramic, glass-ceramic, plastic, or another suitable material. The cover 102 may include opaque masks, inks, coatings, or other treatments that define an opaque border around or along a side of a transparent display region. Graphical outputs may be visible through the cover 102 in the transparent display region.

The display 103 may be at least partially positioned within the interior volume of the housing structure 104. The display 103 (or a display element of the display) may be coupled to the cover 102, such as via an adhesive (e.g., an optically clear adhesive) or other coupling scheme. The display 103 (or a display element of the display 103) may be a liquid-crystal display (LCD), a light-emitting diode display, an organic light-emitting diode (OLED) display, an active-matrix organic light emitting diode (AMOLED) display, an organic electroluminescent (EL) display, an electrophoretic ink display, or the like. The display 103 may be configured to display graphical outputs, such as graphical user interfaces, that the user may view and interact with. The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor).

The display 103 may include or be associated with one or more touch- and/or force-sensing systems. In some cases, components of the touch- and/or force-sensing systems are integrated with the display element. For example, electrode layers of a touch and/or force sensor may be provided in a stack that includes display components (and is optionally attached to or at least viewable through the cover 102).

The touch- and/or force-sensing systems may use any suitable type of sensing technology, including capacitive sensors, resistive sensors, surface acoustic wave sensors, piezoelectric sensors, strain gauges, or the like. The front exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system.

The device 100 may also include a front-facing camera 106. The front-facing camera 106 may be positioned below or otherwise covered and/or protected by the cover 102. The front-facing camera 106 may have any suitable operational parameters. For example, the front-facing camera 106 may include a 7.2 megapixel sensor (with 1 micron pixel size), and a fixed-focus lens with an aperture number of f/2.2. Other types of cameras may also be used for the front-facing camera 106.

The device 100 may also include a button 108 with which a user may interact to control aspects of the device 100. In some cases, the button 108 is configured to not move (or to be substantially non-movable) relative to the cover 102 or other structure of the device 100. In such cases, the button 108 may be touch- and/or force-sensitive so as to detect user inputs applied to the button 108. The button 108 may be associated with a haptic actuator (e.g., the haptic actuator 214, FIG. 2) that is configured to produce a haptic output in response to detecting an input at the button 108. The haptic output, which may be a vibration, pulse, shake, electrostatic stimulus, or other type of tactile output, may indicate to a user that an input has been detected.

The button 108 may also include a fingerprint sensor (or include components of a fingerprint sensor). The fingerprint sensor may be configured to capture an image or other representative data of a finger that is in contact with the button 108. The device may verify that a user is an authorized user by comparing a captured image (or other representative data) of a finger that is in contact with the button 108 with stored images (or other representative data) of authorized users.

The device 100 may also include other buttons (e.g., buttons 116, 120), switches (e.g., switch 118), and/or other physical input systems. Such input systems may be used to control power states (e.g., the button 120), change speaker volume (e.g., buttons 116), switch between "ring" and "silent" modes, and the like (e.g., switch 118).

The device 100 may also include a speaker outlet 110 to provide audio output to a user, such as to a user's ear during voice calls. The device 100 may also include a charging port 112 (e.g., for receiving a power cable for providing power to the device 100 and charging the battery of the device 100). The device 100 may also include loudspeaker openings 114. The loudspeaker openings 114 may allow sound output from an internal speaker system (e.g., the speaker system 216, FIG. 2) to exit the housing structure 104. The device 100 may also include one or more microphones. In some cases, a microphone within the housing structure 104 may be acoustically coupled to the surrounding environment through a loudspeaker opening 114.

The housing structure 104 may be a multi-piece housing. For example, the housing structure 104 may be formed from multiple housing members 124, 126, 128, and 130, which are structurally coupled together via one or more joint structures 122 (e.g., 122-1-122-4). Together, the housing members 124, 126, 128, and 130 and the joint structures 122 may define a band-like housing structure that defines four sidewalls (and thus four side exterior surfaces) of the device 100. Thus, both the housing members and the joint structures define portions of the side exterior surfaces of the device 100.

The housing members 124, 126, 128, and 130 may be formed of a conductive material (e.g., a metal such as aluminum, stainless steel, or the like), and the joint structures 122 may be formed of one or more polymer materials (e.g., glass-reinforced polymer). The joint structures 122 may include two or more molded elements, which may be formed of different materials. For example, an inner molded element may be formed of a first material (e.g., a polymer material), and an outer molded element may be formed of a second material that is different from the first material (e.g., a different polymer material). The materials may have different properties, which may be selected based on the different functions of the inner and outer molded elements. For example, the inner molded element may be configured to make the main structural connection between housing members, and may have a higher mechanical strength and/or toughness than the outer molded element. On the other hand, the outer molded element may be configured to have a particular appearance, surface finish, chemical resistance, water-sealing function, or the like, and its composition may be selected to prioritize those properties or functions over mechanical strength.

In some cases, one or more of the housing members 124, 126, 128, and 130 (or portions thereof) are configured to operate as antennas (e.g., members that are configured to transmit and/or receive electromagnetic waves to facilitate wireless communications with other computers and/or devices). To facilitate the use of the housing members as antennas, feed and ground lines may be conductively coupled to the housing members to couple the housing members to other antenna and/or communication circuitry. Further, the joint structures 122 may be substantially non-conductive to provide suitable separation and/or electrical isolation between the housing members (which may be used to tune the radiating portions, reduce capacitive coupling between radiating portions and other structures, and the like). The joint structures 122 may be mechanically interlocked with the housing members to structurally couple the housing members and form a structural housing assembly.

The exterior surfaces of the housing members 124, 126, 128, and 130 may have substantially a same color, surface texture, and overall appearance as the exterior surfaces of the joint structures 122. In some cases, the exterior surfaces of the housing members 124, 126, 128, and 130 and the exterior surfaces of the joint structures 122 are subjected to at least one common finishing procedure, such as abrasive-blasting, machining, polishing, grinding, or the like. Accordingly, the exterior surfaces of the housing members and the joint structures may have a same or similar surface finish (e.g., surface texture, roughness, pattern, etc.). In some cases, the exterior surfaces of the housing members and the joint structures may be subjected to a two-stage blasting process to produce the target surface finish.

Figure 1B:
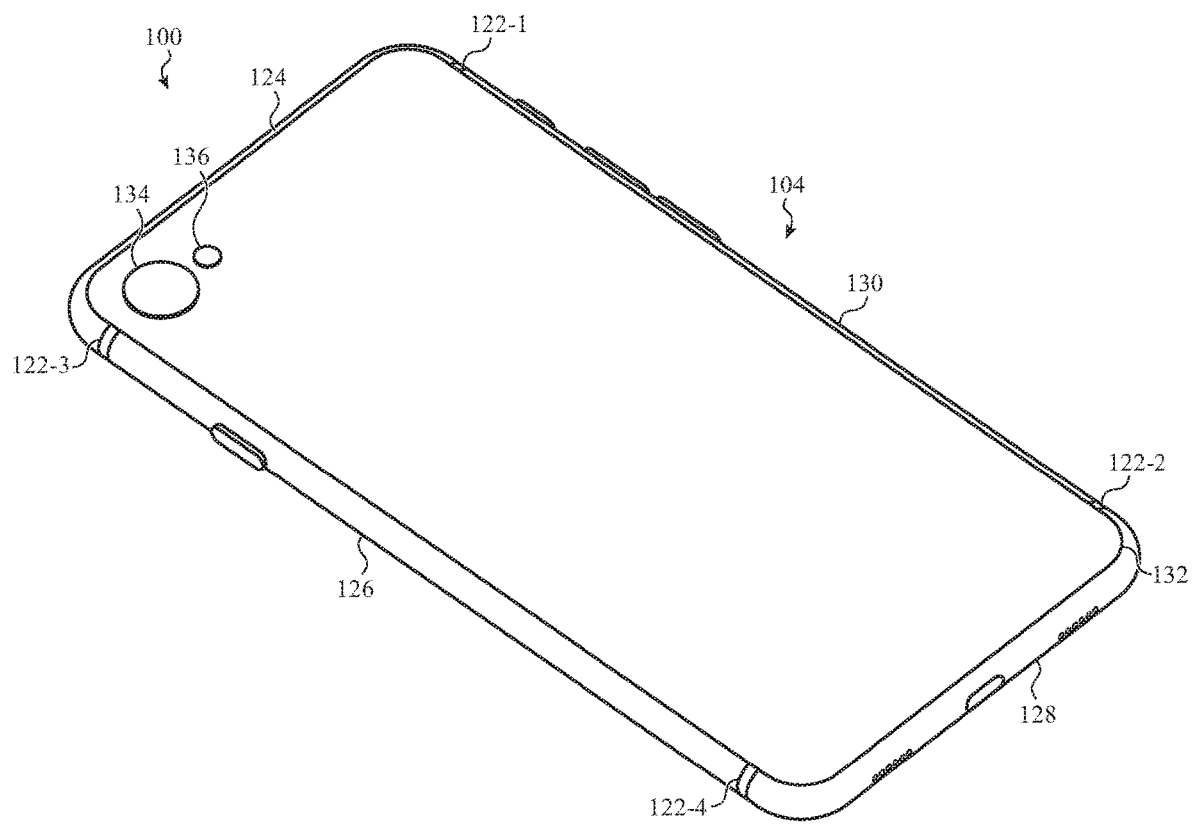

FIG. 1B illustrates a back side of the device 100. The device 100 may include a back cover 132 coupled to the housing 104. The back cover 132 may include a substrate formed of glass, though other suitable materials may alternatively be used (e.g., plastic, sapphire, ceramic, ceramic glass, etc.). The back cover 132 may define a back exterior surface of the device 100. The back cover 132 may include one or more decorative layers on the exterior or interior surface of the substrate. For example, one or more opaque layers may be applied to the interior surface of the substrate (or otherwise positioned along the interior surface of the substrate) to provide a particular appearance to the back side of the device 100. The opaque layer(s) may include a sheet, ink, dye, or combinations of these (or other) layers, materials, or the like. In some cases the opaque layer(s) have a color that substantially matches a color of the housing 104 (e.g., the exterior surfaces of the housing members and the joint structures). The device 100 may include a wireless charging system, whereby the device 100 can be powered and/or its battery recharged by an inductive (or other electromagnetic) coupling between a charger and a wireless charging system within the device 100. In such cases, the back cover 132 may be formed of a material that allows and/or facilitates the wireless coupling between the charger and the wireless charging system (e.g., glass).

The device 100 may also include a rear-facing camera 134 and a flash 136 that is configured to illuminate a scene to facilitate capturing images with the camera 134. The camera 134 may include a 12 megapixel sensor (with 1.4 micron pixel size), and a variable-focus lens with an aperture number of f/1.8. The camera 134 may also include optical image stabilization, whereby the lens is dynamically moved relative to a fixed structure within the device 100 to reduce the effects of "camera shake" on images captured by the camera 134. In some cases, the device 100 may include more rear-facing cameras.

The camera 134, along with associated processors and software, may provide several image-capture features. For example, the camera 134 may be configured to capture full-resolution video clips of a certain duration each time a user captures a still image. As used herein, capturing full-resolution images (e.g., video images or still images) may refer to capturing images using all or substantially all of the pixels of an image sensor, or otherwise capturing images using the maximum resolution of the camera (regardless of whether the maximum resolution is limited by the hardware or software).

The captured video clips may be associated with the still image. In some cases, users may be able to select individual frames from the video clip as the representative still image associated with the video clip. In this way, when the user takes a snapshot of a scene, the camera will actually record a short video clip (e.g., 1 second, 2 seconds, or the like), and the user can select the exact frame from the video to use as the captured still image (in addition to simply viewing the video clip as a video).

The camera 134 may also include a high-dynamic-range (HDR) mode, in which the camera 134 captures images having a dynamic range of luminosity that is greater than what is captured when the camera 134 is not in the HDR mode. In some cases, the camera 134 automatically determines whether to capture images in an HDR or non-HDR mode. Such determination may be based on various factors, such as the ambient light of the scene, detected ranges of luminosity, tone, or other optical parameters in the scene, or the like. HDR images may be produced by capturing multiple images, each using different exposure or other image-capture parameters, and producing a composite image from the multiple captured images.

The camera 134 may also include an object detection mode, in which a user can select (and/or the device 100 can automatically identify) objects within a scene to facilitate those objects being processed, displayed, or captured differently than other parts of the scene. For example, a user may select (or the device 100 may automatically identify) a person's face in a scene, and the device 100 may focus on the person's face while selectively blurring the portions of the scene other than the person's face. Notably, features such as the HDR mode and the object detection mode may be provided with a single camera (e.g., a single lens and a sensor).

The flash 136 is configured to illuminate a scene to facilitate capturing images with the camera 134. The flash 136 may include one or more light sources, such as one or more light emitting diodes (e.g., 1, 2, 3, 4, or more LEDs). The flash 136, in conjunction with the camera 134 or other systems of the device 100, may adjust the color temperature of the light emitted by the light sources in order to match or otherwise adapt to a color temperature within a scene. The device 100 may also be configured to operate the flash 136 and the shutter of the camera 134 to avoid consequences of flash "flicker." For example, the device 100 may avoid capturing exposures during moments where the flash 136 is at a period of no or low illumination (e.g., which may be caused by discontinuous or pulsed operation of the LEDs).

Figure 2:
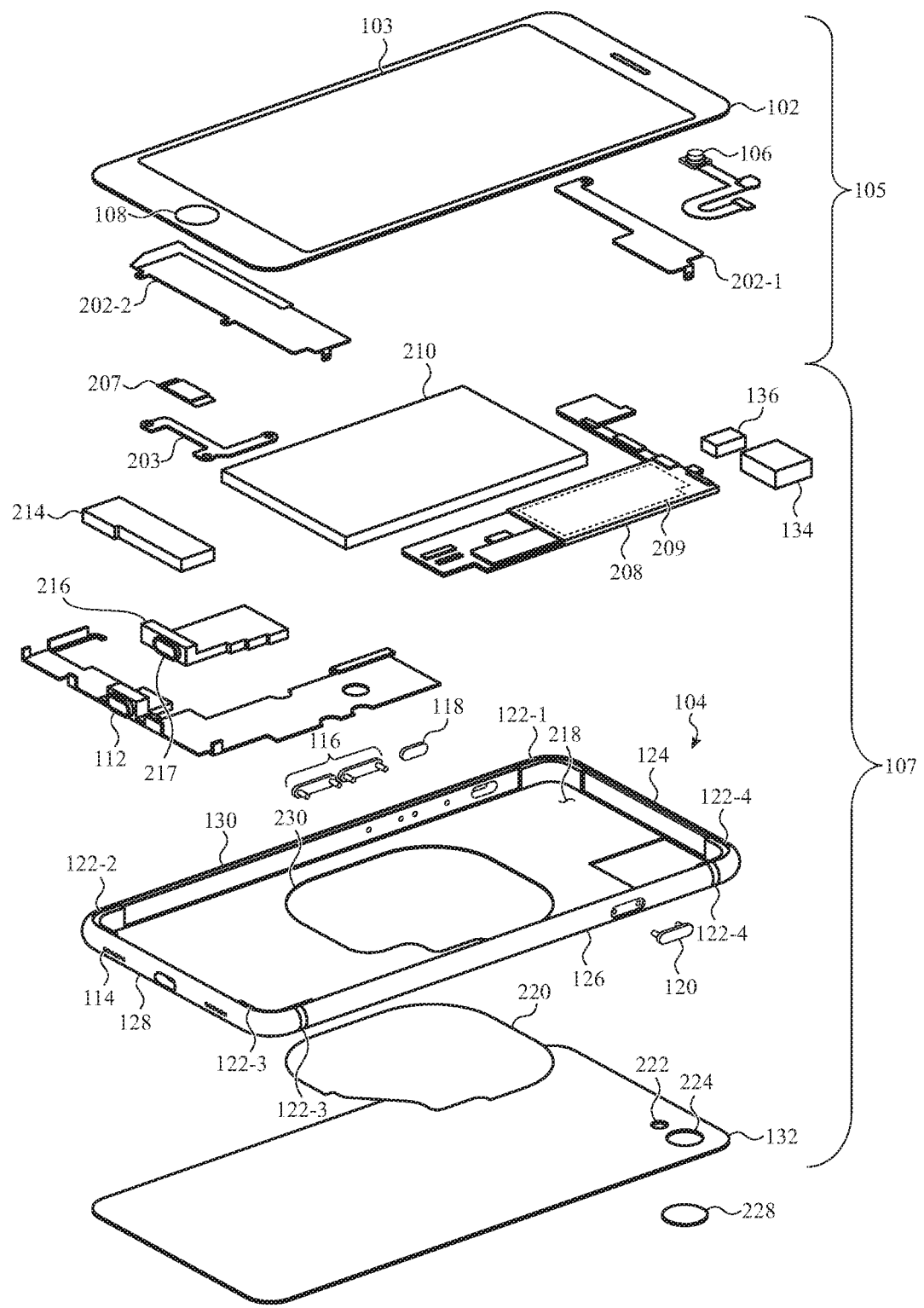
FIG. 2 depicts an exploded view of the device of FIGS. 1A-1B.

FIG. 2 is an exploded view of the device 100, showing various components of the device 100 and example arrangements and configurations of the components. As described above, the device 100 includes a transparent cover 102, which may be formed of glass (or other suitable transparent material such as sapphire, glass-ceramic, plastic, or the like), and which may have a display 103 coupled thereto. As shown in FIG. 2, the display 103 (e.g., a display element of the display 103) is coupled to an internal surface of the cover 102. For example, a display element of the display 103 may be attached to the internal or bottom surface of the cover 102 via an adhesive (e.g., an optically clear adhesive). The display 103 may include touch- and/or force-sensing systems (and/or components of the touch- and/or force-sensing systems), as described herein.

The device 100 may include a front cover assembly 105 that includes at least the transparent cover 102, a display assembly (including and/or corresponding to the display 103), and conductive display cowlings 202 (e.g., conductive display cowlings 202-1 and 202-2). The front cover assembly 105 may be assembled as a separate subassembly than a main assembly 107. In some cases, the front cover assembly 105 may be removably coupled to the main assembly 107 for ease of assembly, replacement, repair, etc. Components of the front cover assembly 105 may be conductively coupled to components of the main assembly 107 via conductive elements, such as conductive connectors positioned on flexible circuit elements. The front cover assembly 105 may be structurally coupled to the main assembly 107 via clips, fasteners, latching structures, and/or other features and/or structures. Other structural, electrical, and/or conductive interconnections between the front cover assembly 105 and the main assembly 107 are also contemplated.

The main assembly 107 may include components of the device, such as the housing 104, the back cover 132, a circuit board assembly 208, etc. In some cases, the main assembly 107 is completely assembled prior to being coupled to the front cover assembly 105, though this is not required. Further, while the instant discussion refers to a device having two assemblies (e.g., a front cover assembly 105 and a main assembly 107), the discussion also applies to devices having different numbers and/or types of assemblies. For example, an embodiment of the device 100 may include a front cover assembly, a main assembly, and a back cover assembly. Further, components described or shown in the instant application as being part of the front cover assembly or main assembly may in some cases be part of a different assembly. For example, a front-facing camera (e.g., the front-facing camera 106) may be part of the front cover assembly 105, the main assembly 107, or a different assembly altogether.

The conductive display cowlings 202 may be attached to the front cover assembly 105 and may overlap portions of the display 103. The conductive display cowlings 202 may provide various functions. For example, as described herein, the conductive display cowlings 202 may be formed of metal or another conductive material and may act as conductive contacts to form a conductive coupling between the front cover assembly 105 and a system ground of the device 100 (e.g., components within the main assembly 107 or other portion of the device 100 that are coupled to or define an electrical ground for the device 100). The conductive display cowlings 202 may also be conductively coupled to one another (e.g., through a conductive frame member of the front cover assembly 105, as described herein), thereby defining a single ground plane for the front cover assembly 105 (which is also conductively coupled to other components of the device 100 to define the system ground). The conductive display cowlings 202 may also define electrostatic discharge paths for the device 100. For example, the conductive display cowlings 202 may define conductive paths through which electrostatic discharges may pass in the event that the device 100 experiences an electrostatic discharge event. The electrostatic discharge paths may be configured to route or otherwise keep current associated with the discharge away from components that are sensitive to such discharges, such as processors, digital electronics, analog circuits, sensors, sensor systems, biometric sensing systems, and the like.

The conductive display cowlings 202 may be conductively coupled to components of the device 100 in the main assembly 107. For example, a circuit cowling 203 (which may be used to cover circuit elements of the device 100, such as a flexible circuit element) may be coupled to the housing 104 or other component(s) or structure(s) of the main assembly 107, and may be conductively coupled to a system ground (e.g., an electrical ground) at least partially defined by components of the main assembly 107. The second display cowling 202-2 may be conductively coupled to the circuit cowling 203 via a compliant conductive member 207. For example, the compliant conductive member 207 may be affixed to the circuit cowling 203 in a location that results in the conductive display cowling 202-2 contacting the compliant conductive member 207 when the front cover assembly 105 is attached to the main assembly 107 of the device 100. Alternatively, the compliant conductive member 207 may be affixed to the conductive display cowling 202-2 such that it contacts the circuit cowling 203 when the front cover assembly 105 is attached to the main assembly 107 of the device 100. The compliant conductive member 207 thus conductively couples the display cowing 202-2 to the circuit cowling 203, thereby conductively coupling the display cowling 202-2 (and thereby the front cover assembly more generally) to the system ground of the device 100. Additionally or alternatively, the first conductive display cowling 202-1 may conductively couple to a conductive component in the main assembly 107 via a compliant conductive member.

Further, the conductive display cowlings 202 (or simply "display cowlings" 202) may be used to retain components of the front cover assembly 105 in target positions and/or orientations. For example, one or more of the display cowlings 202 may be positioned below a flexible circuit of a display element (e.g., capturing the flexible circuit between the display cowling and the display element) to protect the flexible circuit and/or retain it in a particular position and/or orientation.

The display cowlings 202 may be positioned relative to other components in the device such that they provide grounding and structural functions (among other possible functions) to the device 100 while minimizing or otherwise mitigating the effect of the display cowlings 202 on the device size. For example, as described in greater detail herein, the display cowlings 202 may be positioned on the front cover assembly 105 in locations that do not overlap with certain components in the main assembly 107 of the device 100, such as the battery 210. In this way, the thickness of the display cowlings 202, which at least partially overlap the display element, does not interfere with the potential height of the battery in the z-direction (relative to the axes shown in FIG. 1A). Rather, the battery 210 may be directly opposite a bottom surface of the display element, with a gap separating the bottom surface of the display element and the top surface of the battery (e.g., a gap is defined between the directly opposite surfaces of the battery and the display element, and the display cowlings 202 do not intrude into the gap). In this way, the front cover assembly 105 may be positioned closer to the main assembly 107 (or the housing 104) than may be possible if the display cowlings 202 were overlapping with the battery (e.g., if the display cowlings 202 intruded into the gap between the battery and the display element). For example, if the display cowlings 202 were overlapping the battery 210, the front cover assembly 105 as a whole may need to be positioned further away from the battery 210 to maintain a target gap and/or clearance above the battery 210.

FIG. 2 also illustrates the front-facing camera 106 and the rear-facing camera 134 (which may each include a lens, sensor, optional image stabilizing system, and the like), as well as the flash 136. These components may be aligned with transparent portions of the front and/or back covers (or openings through the covers) to facilitate imaging operations through the covers. For example, the flash 136 may be aligned with an opening 222 in the back cover 132, and the rear-facing camera 134 may be aligned with an opening 224 in the back cover 132. A lens cover 228 (e.g., formed of a transparent material such as glass, sapphire, plastic, etc.) may overlie the lens of the rear-facing camera 134 and cover the opening 224. The lens cover 228 may extend beyond the exterior surface of the back cover 132, and may define a recess along the interior side of the back cover 132, such that the lens of the rear-facing camera 134 can extend into the recess. In this way, the device 100 may accommodate a larger lens than would be possible if the recess were not provided.

The device 100 also includes a battery 210. The battery 210 may provide electrical power to the device 100 and its various systems and components. The battery 210 may be recharged via the charging port 112 (e.g., from a power cable plugged into the charging port 112), and/or via a wireless charging system 220. The battery 210 may be coupled to the charging port 112 and/or the wireless charging system 220 via battery control circuitry that controls the power provided to the battery and the power provided by the battery to the device 100. The battery 210 may be a lithium ion battery, or any other suitable type of rechargeable battery. As described above, the battery 210 may be positioned below a portion of the display 103 that is not covered by the display cowlings 202 (e.g., a middle or central region of the display 103).

The wireless charging system 220 may include a coil that inductively couples to an output or transmitting coil of a wireless charger. The coil may provide current to the device 100 to charge the battery 210 and/or power the device.

The device 100 may also include a speaker system 216. The speaker system 216 may be positioned in the device 100 so that an outlet port 217 is aligned with or otherwise proximate a loudspeaker opening 114. Accordingly, sound that is output by the speaker system 216 exits the housing 104 via the loudspeaker opening 114. The speaker system 216 may include a speaker positioned in a housing that defines a speaker volume (e.g., an empty space in front of or behind a speaker diaphragm). The speaker volume may be used to tune the audio output from the speaker and optionally mitigate destructive interference of the sound produced by the speaker.

The device 100 may also include a haptic actuator 214. The haptic actuator may include a movable mass and an actuation system that is configured to move the mass to produce a haptic output. The actuation system may include one or more coils and one or more magnets (e.g., permanent and/or electromagnets) that interact to produce motion. The magnets may be or may include recycled magnetic material.

When the coil(s) are energized, the coil(s) may cause the mass to move, which results in a force being imparted on the device 100. The motion of the mass may be configured to cause a vibration, pulse, tap, or other tactile output detectable via an exterior surface of the device 100. The haptic actuator 214 may be configured to move the mass linearly, though other movements (e.g., rotational) are also contemplated. Other types of haptic actuators may be used instead of or in addition to the haptic actuator 214.

The device 100 also includes a circuit board assembly 208. The circuit board assembly 208 may include a substrate, and processors, memory, and other circuit elements coupled to the substrate. The circuit board assembly 208 may also include wireless communications circuitry, which may be coupled to and/or otherwise use the housing members 124, 126, 128, 130 (or portions thereof) as radiating structures to provide wireless communications. The circuit board assembly 208 may also include components such as accelerometers, gyroscopes, near-field-communications circuitry and/or antennas, compasses, and the like.

The circuit board assembly 208 may include a graphite layer 209 defining at least a portion of a top surface of the circuit board assembly 208. The graphite layer 209 may be configured to conduct heat from components of the circuit board assembly 208 and distribute the heat over the surface area of the graphite layer 209. For example, a processor on the circuit board assembly 208 may generate heat when the device 100 is in use. This heat may be produced within a relatively small area (e.g., the area of the processor itself). The graphite layer 209, which may have a larger footprint or surface area than the processor, may conduct the heat from the processor and distribute it over a larger area (as compared to a circuit board assembly without the graphite layer 209), thereby reducing the peak temperature of the circuit board assembly 208. The graphite layer 209 may also help cool or reduce the temperature of the circuit board assembly 208 and/or the components thereon. For example, by distributing the heat over the larger surface area of the graphite layer 209, more of the heat may be able to dissipate or otherwise be removed from the graphite layer 209. In some cases, all or some of the top surface of the graphite layer 209 is positioned across a gap from the bottom surface of a display element which itself may include a graphite layer as described herein. The gap may be free of interstitial components or objects (e.g., it may be an air gap).

The housing 104 may also include a frame 218, which may be attached to the housing 104. The frame 218 may be formed of metal, and may act as a structural mounting point for components of the device 100. The frame 218 may define an opening 230 that corresponds to the wireless charging system 220, such that the frame 218 does not shield the wireless charging system 220 or otherwise negatively affect the inductive coupling between the coil of the charging system 220 and an external wireless charger.

As described above, the housing 104 may include housing members 124, 126, 128, and 130 structurally joined together via joint structures 122. FIG. 2 illustrates how the joint structures 122 may extend over inner surfaces of the housing members. More particularly, a portion of the joint structures 122 may contact, cover, encapsulate, and/or engage with retention features of the housing members that extend from the inner surfaces of the housing members.

Figure 3A:
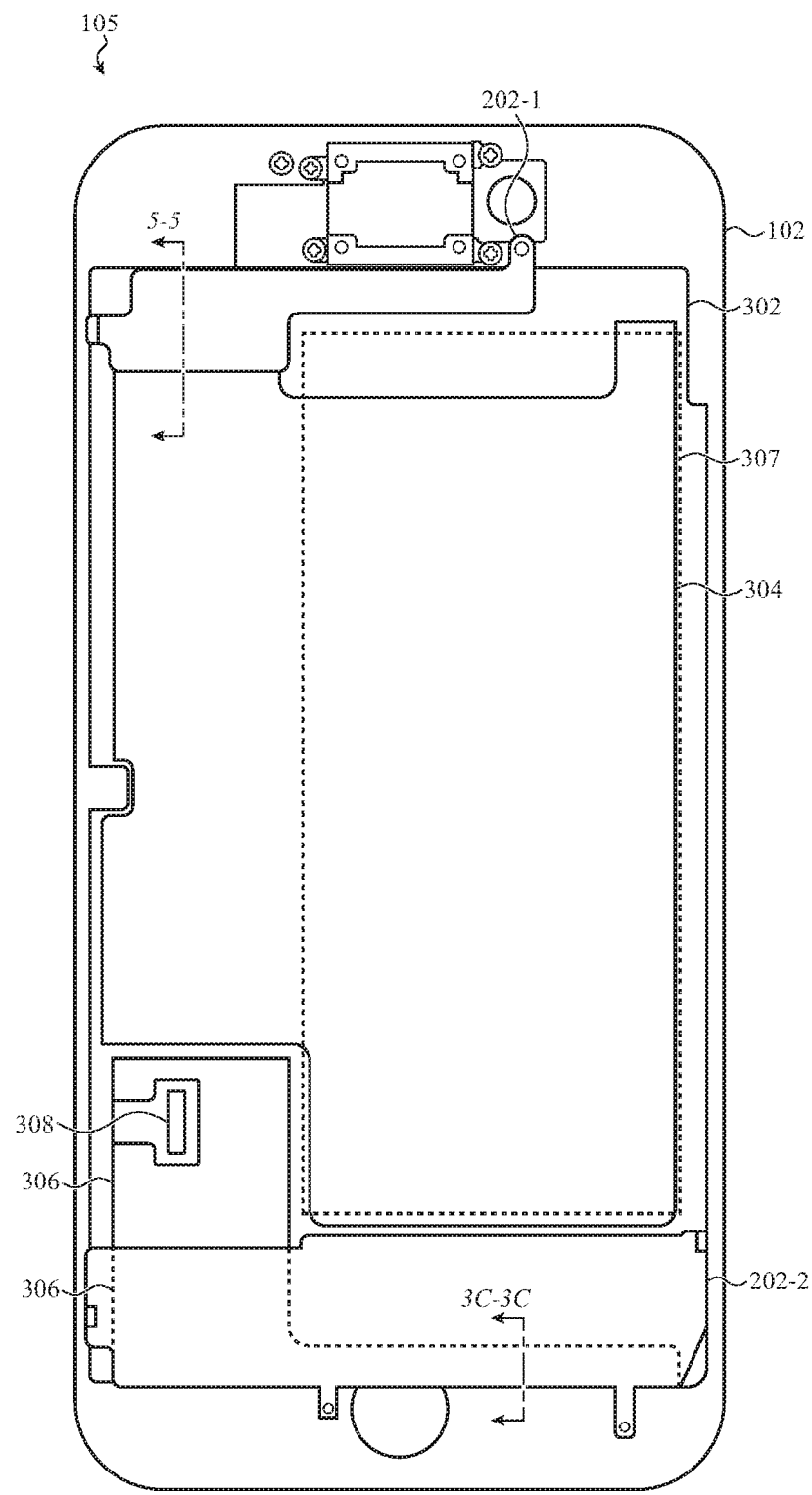
FIG. 3A depicts a front cover assembly of the device of FIGS. 1A-1B.

FIG. 3A is an under-side view of the front cover assembly 105, illustrating the arrangement and positioning of components of the front cover assembly 105. For example, the front cover assembly 105 includes a display element 302, which may be part of the display 103. The display element 302 may be configured to produce graphical outputs visible through the front cover 102. The display element 302 may include multiple components and/or layers, including, for example, back reflector layer(s), LEDs or other light sources, light guide layer(s), light redirection layer(s), polarizer(s), diffuser(s), liquid crystal layer(s), electrode layer(s), flexible circuit element(s), and the like.

The front cover assembly 105 may also include a first conductive display cowling 202-1 positioned below a first region of the display element 302, and a second conductive display cowling 202-2 below a second region of the display element 302. As shown, the first conductive display cowling 202-1 is positioned below the display element 302 proximate an upper portion of the front cover assembly 105 (corresponding to the side of the device that includes a speaker for directing sound into a user's ear during a telephone call), and the second conductive display cowling 202-2 is positioned below the display element 302 proximate a lower portion of the front cover assembly 105 (corresponding to the side of the device that includes a microphone for detecting sound from a user during a telephone call). The first and second conductive display cowlings 202 are set apart from one another such that a central or middle region of the display element 302 is not covered by the conductive display cowlings 202. Stated another way, the conductive display cowlings 202 do not overlap a middle or central region of the display element 302.

As described herein, the first and second display cowlings 202 and the battery 210 may be positioned so that they do not overlap one another. FIG. 3A illustrates an example outline 307 showing an example location of the battery 210 relative to the first and second display cowlings 202. More particularly, because the battery 210 is not attached to the front cover assembly 105, the outline 307 represents a projection of the battery 210 on the front cover assembly 105, and shows the location of the outer periphery of the battery relative to the front cover assembly 105. As shown in FIG. 3A, the battery 210, represented by the outline 307, is located opposite a region of the display 302 that is between the first display cowling 202-1 and the second display cowling 202-2. Stated another way, the first display cowling 202-1 is positioned outside of an outer periphery of the battery 210, and the second display cowling 202-2 is also positioned outside of the outer periphery of the battery 210. In this way, the battery 210 and the display cowlings are arranged in a non-overlapping arrangement, and the thickness of the display cowlings 202 does not affect the target gap and/or clearance above the battery 210 (e.g., between the battery and the nearest component of the front cover assembly 105 that is opposite the battery 210).

The conductive display cowlings 202 may be configured to cover and/or retain components of the front cover assembly 105. For example, the display element 302 may include a flexible circuit element 306 that extends from a side of the display element 302 and is configured to be conductively coupled to a circuit board assembly (or other component) of the device 100. The flexible circuit element 306 may include a connector 308 that is configured to conductively and mechanically couple to a corresponding connector on the circuit board assembly or other component in the main assembly 107 of the device 100. The connector 308 may be positioned on a portion of the flexible circuit element 306 that is not covered by the conductive display cowling 202-2, such that the connector 308 is accessible to be coupled to a component in the main assembly 107.

Figure 3B:
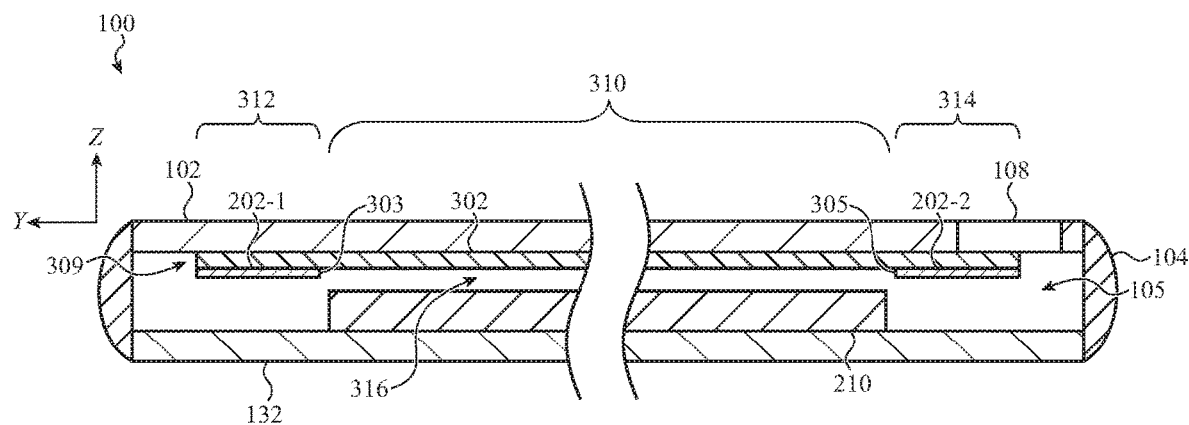
FIG. 3B depicts a partial cross-sectional view of the device of FIGS. 1A-1B.
Figure 3C:
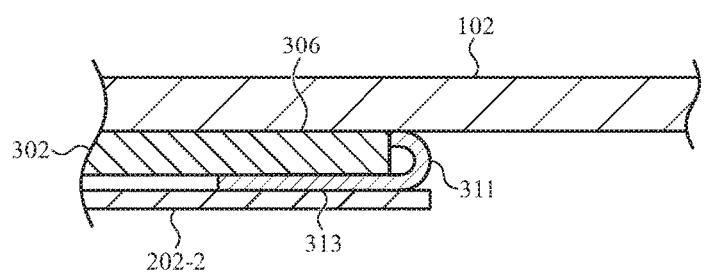
FIG. 3C depicts a partial cross-sectional view of the device of FIGS. 1A-1B.

FIG. 3C is a partial cross-sectional view of the front cover assembly 105, viewed along line 3C-3C in FIG. 3A. As shown in FIGS. 3A and 3C, the flexible circuit element 306 may extend from a lower side of the display element 302 (though other locations are also contemplated). The flexible circuit element 306 may be folded or looped such that a portion 313 of the flexible circuit element 306 is generally parallel to and extends along the bottom surface of the display element 302. The conductive display cowling 202-2 may be positioned below the flexible circuit element 306 such that the flexible circuit element 306 (e.g., the portion 313 of the flexible circuit element and optionally the loop 311) is captured between the conductive display cowling 202-2 and the display element 302. In this way, the conductive display cowling 202 may help maintain the positioning of the flexible circuit element 306 on the front cover assembly 105. Further, the conductive display cowling 202-2 may protect the flexible circuit element 306 by physically covering at least a portion of it and by reducing the likelihood that the flexible circuit element 306 will flex during use, assembly, repair, or the like. For example, as noted above, the flexible circuit element 306 may be folded or looped where it exits the side of the display element 302 and is folded back in order to lay flat on the bottom surface of the display element 302. The loop 311 of the flexible circuit element 306 may stress the flexible circuit element 306, resulting in the loop being more susceptible to damage if it is subjected to physical contact, flexing, bending, or the like. By capturing and covering portions of the flexible circuit element, including optionally covering the looped portion 311 of the flexible circuit element 306, the conductive display cowling 202-2 may help protect the circuit element and prevent or reduce the likelihood of damage.

The display element 302 may include a graphite layer 304 defining at least a portion of a bottom surface of the display element 302. The graphite layer 304 may be configured to distribute and/or dissipate heat from the display element 302. For example, the graphite layer 304 may have a high thermal conductivity, especially in an x-y plane of the device. Accordingly, heat produced by the display element 302 may be conducted along the graphite layer 304, thereby efficiently spreading the heat over the area of the graphite layer 304 and reducing the peak temperatures along the display element 302. In some cases, the graphite layer 304 may also aid in dissipating heat from the display element 302 by distributing it across a larger surface area (as compared to a display element 302 without the graphite layer 304), thereby increasing the ability for the heat to be removed via convection, radiation, conduction, or the like. At least a portion of the graphite layer 304 may be positioned across a gap from the battery 210 of the device 100.

FIG. 3B is a partial cross-sectional view of the device 100, viewed along line 3B-3B in FIG. 1A, illustrating relative positioning of the battery 210, conductive display cowlings 202, and the display element 302. As shown, the battery 210 is positioned below a display assembly 309, with a gap 316 defined between the top surface of the battery and the bottom surface of the display element 302. As noted above, in some cases, there may be no intervening or interstitial components, other than air, between the top surface of the battery 210 and the bottom surface of the display element 302, and/or the entire top surface of the battery 210 may be directly opposite the bottom surface of the display element 302.

The display assembly 309 includes the display element 302 and the conductive display cowlings 202. The first conductive display cowling 202-1 is positioned below a first region 312 of the display element 302 (e.g., an upper region of the display element 302, proximate an upper side of the device 100), and the second conductive display cowling 202-2 is positioned below a second region 314 of the display element 302 (e.g., a lower region, proximate a lower side of the device 100). The first conductive display cowling 202-1 may be spaced apart from the second conductive display cowling 202-2, thereby forming a gap between the first conductive display cowling 202-1 and the second conductive display cowling 202-2. The gap may correspond to a region 310 that is defined between the conductive display cowlings 202. The gap may extend along a first direction (e.g., left-to-right as shown in FIG. 3B) from an edge 303 of the first conductive display cowling 202-1 to an edge 305 of the second conductive display cowling 202-2. The battery 210 may be positioned below the gap between the first and second conductive display cowlings 202, and may not extend (in the first direction) past the edges 303, 305. In some cases, the battery 210 is spaced apart, along the first direction, from both edges 303, 305 (e.g., as viewed along the z-axis, peripheral edges of the battery 210 are spaced apart from the edges 303, 305 along the y-axis).

Further, as shown in FIG. 3B, the first and second conductive display cowlings 202 are positioned outside an outer periphery of the battery 210, such that they do not overlap the top surface of the battery 210 (e.g., projections of the conductive display cowlings 202 in the x-y plane do not overlap a projection of the battery 210 in the x-y plane). Further, the battery 210 is positioned below a third region 310 of the display element 302, where the third region 310 is between the first region and the second region of the display element 302.

This configuration of the battery 210 and the display assembly 309 results in the conductive display cowlings 202 not overlapping the battery 210, such the display element 302, and not either of the conductive display cowlings 202, is facing or opposite to the top surface of the battery 210. In this way, a target clearance between the battery 210 and the display assembly 309 can be maintained while reducing the overall thickness of the device 100. For example, if the conductive display cowlings 202 overlapped the battery, the front cover assembly 105 as a whole may have to be mounted further away from the battery 210 to maintain a target clearance and/or gap between the battery 210 and components positioned above it. By positioning the battery 210 below a region of the display element 302 that is not covered by the conductive display cowlings 202 (and/or by positioning the conductive display cowlings 202 outside the outer periphery of the battery 210), the front cover assembly 105 may be positioned closer to the battery 210, as the display cowlings do not interfere with or otherwise intrude into the gap between the top surface of the battery 210 and the bottom surface of the display element 302.

As shown in FIG. 3B, the battery 210 and the conductive display cowlings 202 do not overlap along the z-axis (e.g., the bottom surfaces of the conductive display cowlings 202 are higher, in the z direction, than the top surface of the battery 210). In some cases, however, one or both of the conductive display cowlings 202 extend below the top surface of the battery 210 along the z-axis (e.g., the bottom surface of one or more of the conductive display cowlings 202 extends below, overlaps with, and/or is lower than the top surface of the battery 210 along the z direction).

Figure 4:
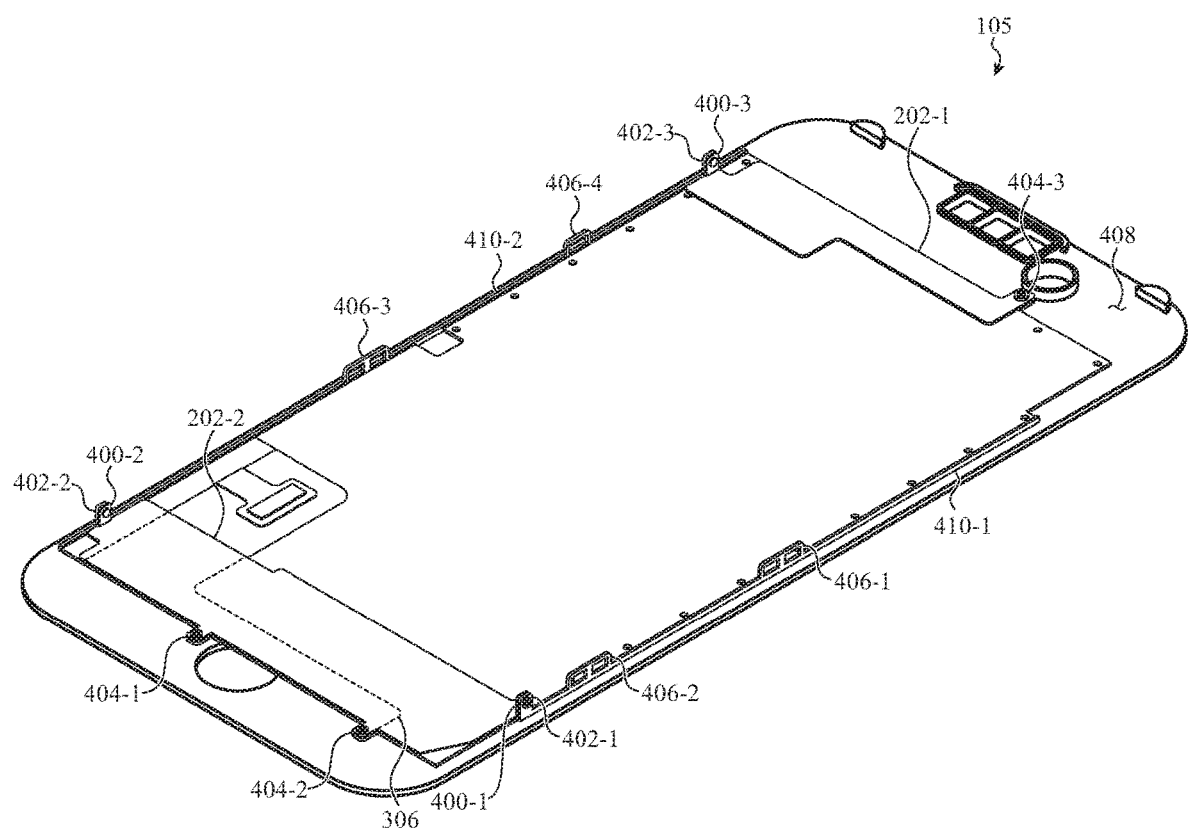
FIG. 4 depicts the front cover assembly of the device of FIGS. 1A-1B.

FIG. 4 is a perspective view of the front cover assembly 105. As described herein, the conductive display cowlings 202 may be conductively coupled to a system ground of the device 100. More particularly, the conductive display cowlings 202 may be used as contacts that conductively couple the front cover assembly 105 to circuit components in the main assembly 107 that at least partially define the system ground. Additionally, the conductive display cowlings 202 may be conductively coupled together through other conductive components of the front cover assembly 105, thereby providing a common electrical ground for the front cover assembly 105.

As shown in FIG. 4, the front cover assembly 105 includes one or more mounting frames 410 (e.g., mounting frames 410-1, 410-2). The mounting frame(s) 410 may be formed from metal or another conductive material, and may be coupled to a polymer structure 408 of the front cover assembly 105, thereby coupling the mounting frame(s) 410 to the cover 102. The mounting frame(s) 410 may resemble vertical flanges or walls extending from the polymer structure 408. The polymer structure 408 may be formed by molding a polymer material against the cover 102 and/or other components of the front cover assembly 105. In some cases, the polymer structure 408 is molded or otherwise formed separately from the cover 102 and attached to the front cover, such as with an adhesive.

The mounting frame(s) 410 may be at least partially embedded in the polymer structure 408. For example, the cover 102 and the mounting frame(s) 410 may be placed into a mold, and a polymer material may be introduced into the mold to mold against the cover 102 and at least partially surround or encapsulate the mounting frame(s) 410. Portions of the mounting frame(s) 410 may be exposed or otherwise not embedded in the polymer structure 408. For example, the mounting frame(s) 410 may include mounting tabs 400 (e.g., tabs 400-1-400-3) and retention tabs 406 (e.g., tabs 406-1-406-4) that extend above the polymer structure 408.

The retention tabs 406 may be configured to attach to complementary retention features on the main assembly 107. For example, spring members, clips, or other mechanisms coupled to the main assembly 107 may engage (e.g., extend into) the openings in the retention tabs 406 to retain the front cover assembly 105 (including the cover 102) to the main assembly 107. The retention tabs 406 and the complementary retention features may removably or releasably engage one another, such that the front cover assembly 105 can be decoupled from the main assembly 107, such as for repair, recycling, or the like.

The mounting tabs 400 may be configured to conductively couple to the conductive display cowlings 202 and structurally retain the conductive display cowlings 202 to the front cover assembly 105. For example, the conductive display cowlings 202 may define corresponding mounting tabs 402 (e.g., tabs 402-1-402-3) that are fastened to the mounting tabs 400 of the mounting frame(s) 410, such as with a screw, weld, or other fastener or attachment technique. The fastener may both conductively and structurally couple the tabs 400, 402 together, thereby securing the conductive display cowlings 202 to the front cover assembly 105 and defining a conductive path between the conductive display cowlings 202 and the mounting frame(s) 410.

The mounting frame(s) 410 may extend continuously along a portion of a side of the front cover assembly 105. In some cases, one or more of the mounting frames 410 may be conductively coupled to both of the conductive display cowlings 202 to define a common electrical potential among the conductive display cowlings 202 and the mounting frame(s) 410. For example, as shown in FIG. 4, the first (or upper) conductive display cowling 202-1 may be conductively (and structurally) coupled to the mounting frame 410-2 via the tabs 400-3 and 402-3, and the second (or lower) conductive display cowling 202-2 may be conductively (and structurally) coupled to the mounting frame 410-2 via the tabs 400-1 and 402-1, and 400-2 and 402-2. Accordingly, the conductive display cowlings 202 are conductively coupled to one another via the mounting frame 410-2. As one or both of the conductive display cowlings 202 may be conductively coupled to system-ground level components of the main assembly 107, the mounting frame(s) 410 and conductive display cowlings 202 may define part of the system ground of the overall device 100. In some cases, the retention tabs 406 are conductively coupled to the complementary retention features of the main assembly 107, which may be coupled to or define a system ground. In such cases, the front cover assembly 105 may be coupled to the system ground via the retention tabs 406 as well.

The conductive display cowlings 202 may also define mounting tabs that couple the conductive display housings to mounting features on the front cover assembly. For example, FIG. 4 illustrates the second conductive display cowling 202-2 defining mounting tabs 404-1 and 404-2, and the first conductive display cowling 202-1 defining a mounting tab 404-3. The mounting tabs 404 may include a hole to receive a fastener (e.g., a screw, bolt, rivet, etc.) therethrough, or otherwise facilitate coupling the conductive display cowlings to the front cover assembly 105. In some cases, mounting features are formed by or captured in the polymer structure, and are positioned below the mounting tabs 404 to receive the fastener.

Figure 5:
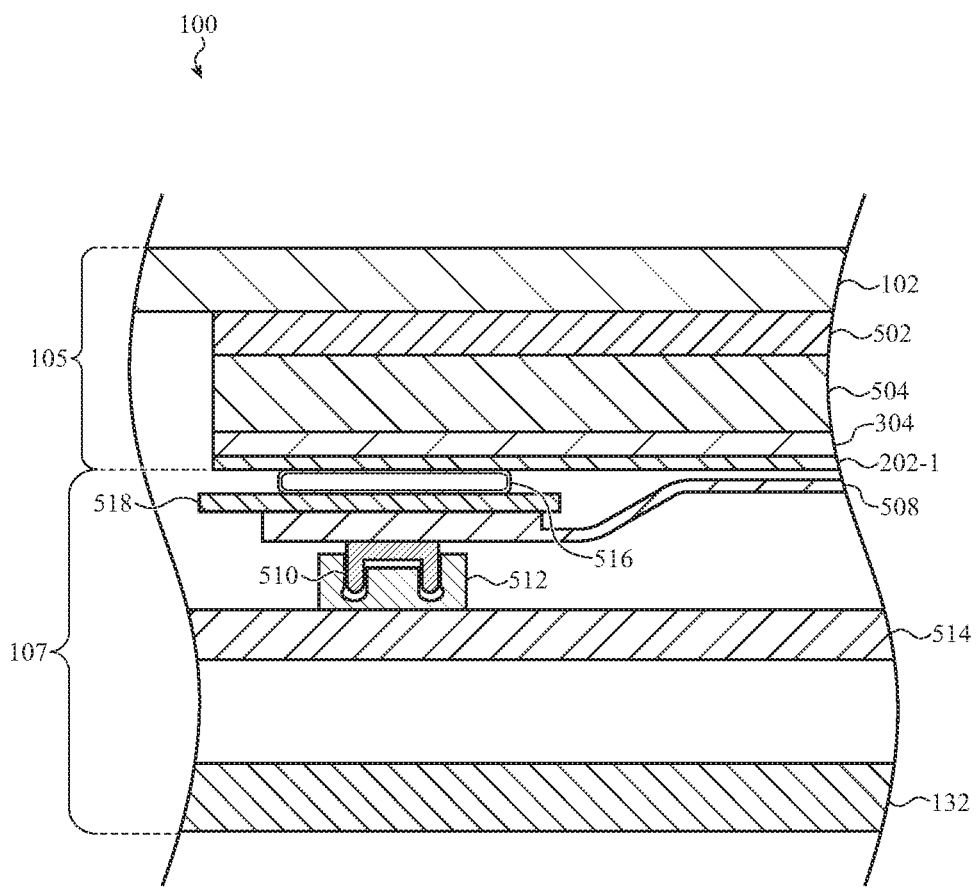
FIG. 5 depicts a partial cross-sectional view of the device of FIGS. 1A-1B.

FIG. 5 is a partial cross-sectional view of the device 100, viewed along line 5-5 in FIG. 3A (FIG. 5 includes components not shown in FIG. 3A). FIG. 5 illustrates an example configuration in which the first conductive display cowling 202-1 is engaged with a component of the main assembly 107 via a compliant structure 516. As shown in FIG. 5, the device 100 includes display layers 504 (e.g., back reflector layer(s), LEDs or other light sources, light guide layer(s), light redirection layer(s), polarizer(s), diffuser(s), liquid crystal layer(s), electrode layer(s), and the like) attached to the cover 102 with an adhesive 502, such as an optically clear adhesive. The optional graphite layer 304 may be disposed along a bottom exterior surface of the display layers 504 to define the bottom exterior surface of the display element 302, as described herein. As shown, the graphite layer 304 extends to the edge of the display layers 504 (and between the display layers 504 and the first conductive display cowling 202-1), though this is merely one example implementation. In some cases, the graphite layer 304 does not extend to the edge of the display layers 504, and/or is not positioned between the display layers 504 and the first conductive display cowling 202-1.

The main assembly 107 may include a first circuit element 508 that is conductively coupled to a second circuit element 514 via a set of complementary electrical connectors 510, 512. In this example, the first circuit element 508 may be a flexible circuit element that is configured to conductively couple a component of the front cover assembly 105, such as a front-facing camera, to the circuit board assembly (which may be represented by the second circuit element 514 in FIG. 5) in the main assembly 107. The device 100 may also include a circuit cowling 518 that is positioned over the first circuit element 508 and optionally configured to contact the first circuit element 508 to maintain the physical engagement between the complementary electrical connectors 510, 512.

A compliant structure 516, such as a loop gasket (e.g., a loop of material surrounding or defining an air core), may be positioned between the first conductive display cowling 202-1 and the circuit cowling 518. In some cases, the compliant structure 516 is compressed between the first conductive display cowling 202-1 and the circuit cowling 518, such that a downward force (relative to the orientation of FIG. 5) is imparted through the compliant structure 516 to the circuit cowling 518. This force may help retain the complementary electrical connectors 510, 512 in engagement with one another.

In some cases, the compliant structure 516 is electrically conductive, such that the compliant structure 516 conductively couples the circuit cowling 518 to the first conductive display cowling 202-1. In such cases, the circuit cowling 518 may be conductively coupled to or otherwise at least partially define the system ground of the device 100, and the conductive coupling via the compliant structure 516 may couple the first conductive display cowling 202-1 to the system ground. In some cases, the compliant structure 516 is not electrically conductive. In such cases, the first conductive display cowling 202-1 may not be conductively coupled to the circuit cowling 518, or it may be conductively coupled to the circuit cowling 518 via another conductive coupling. In some cases, the compliant structure 516 is thermally conductive, facilitating transfer of heat between components that it contacts (e.g., the first conductive display cowling 202-1 and the circuit cowling 518 in the example of FIG. 5).

Figure 6A:
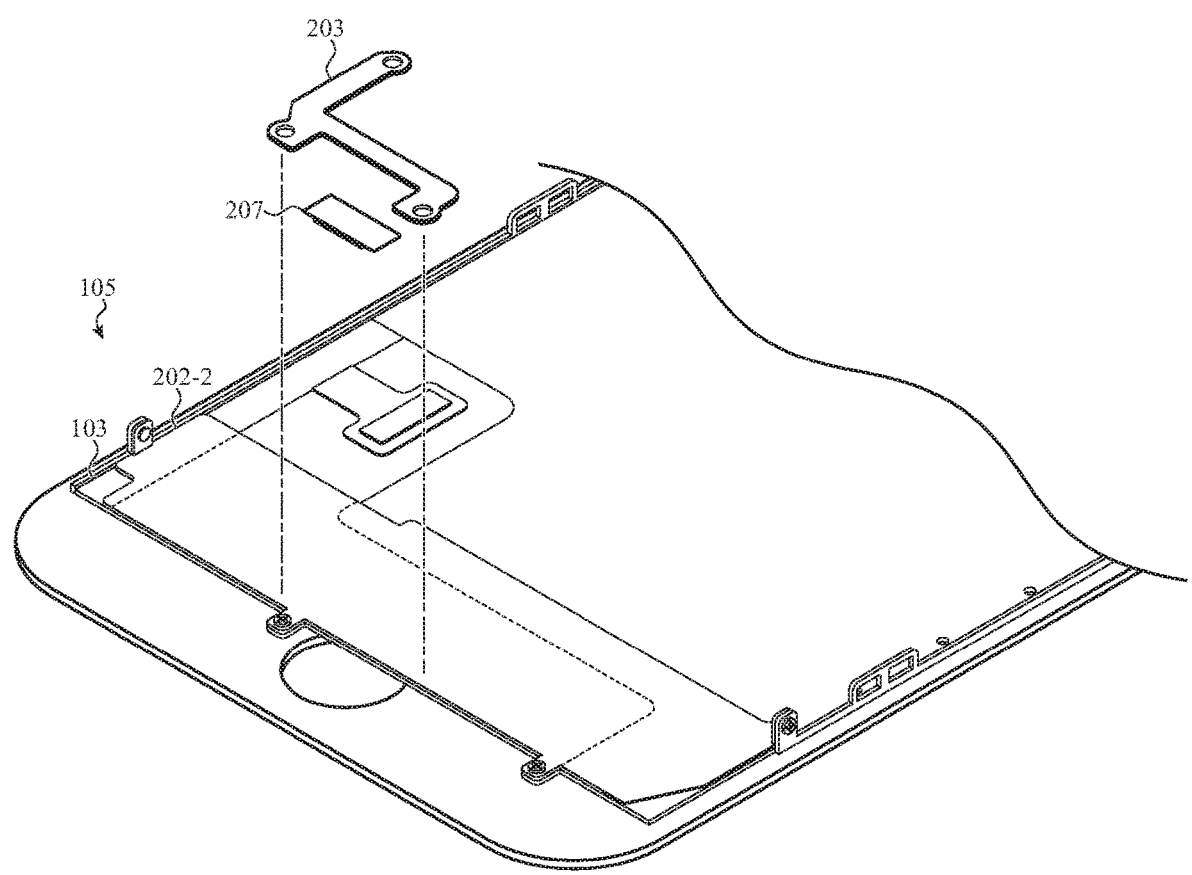
FIG. 6A depicts an exploded view of a portion of the device of FIGS. 1A-1B.
Figure 6B:
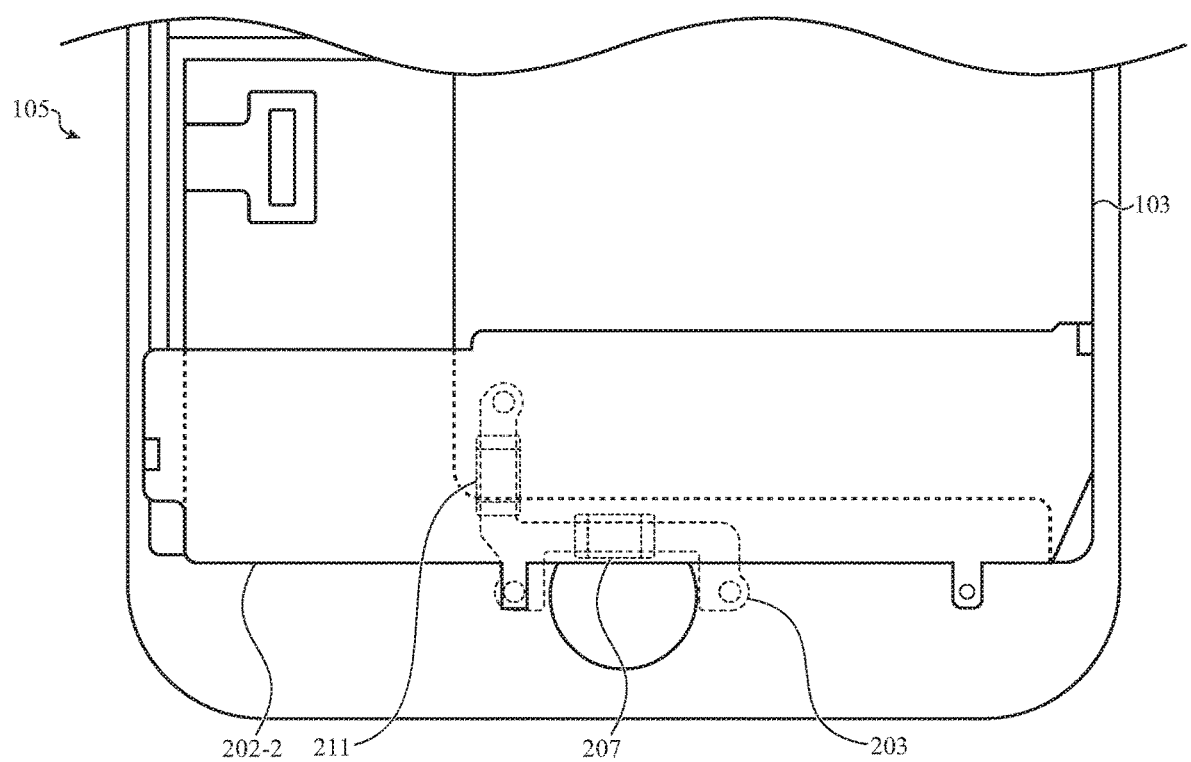
FIG. 6B depicts a portion of the front cover assembly of the device of FIGS. 1A-1B.

FIG. 6A is a partial exploded view of the front cover assembly 105 of the device 100, and FIG. 6B is a bottom view of the front cover assembly 105, illustrating how the second conductive display cowling 202-2 is conductively coupled to a component on the main assembly 107 of the device 100. For example, as noted above, the device 100 may include a circuit cowling 203, which may be coupled to the main assembly 107 to cover and/or protect a circuit element and/or other components of the device. A compliant conductive member 207 may be positioned between the second conductive display cowling 202-2 and the circuit cowling 203 such that when the front cover assembly 105 is attached to the main assembly 107, both the second conductive display cowling 202-2 and the circuit cowling 203 physically contact the compliant conductive member 207. The compliant conductive member 207 thereby conductively couples the second conductive display cowling 202-2 and the circuit cowling 203.

The compliant conductive member 207 may be configured to compress or otherwise deform between the second conductive display cowling 202-2 and the circuit cowling 203 such that the conductive coupling can be established and maintained despite possible differences in the distance between the second conductive display cowling 202-2 and the circuit cowling 203, such as due to manufacturing tolerances and the like. Further, the compression of the compliant conductive member 207 results in the compliant conductive member 207 producing a biasing force against the second conductive display cowling 202-2 and the circuit cowling 203 that ultimately maintains the compliant conductive member 207 in physical (and thus conductive) contact with the surfaces of the second conductive display cowling 202-2 and the circuit cowling 203.

In some cases, instead of or in addition to conductively coupling to the circuit cowling 203, the second conductive display cowling 202-2 may be conductively coupled to another component, such as a dedicated conductive coupler, tab, shroud, structural component, housing member, or the like. Further, while FIGS. 6A-6B illustrate one example conductive coupling between the second conductive display cowling 202-2 and components in the main assembly 107, in some cases more conductive couplings exist between the conductive display cowlings 202 and the main assembly 107. For example, FIG. 6B illustrates an additional compliant conductive member 211 positioned between the second conductive display cowling 202-2 and the circuit cowling 203 (e.g., along a different portion of the circuit cowling 203). In some cases, the additional compliant conductive member 211 may contact or be coupled to a different component of the main assembly 107. Further, one or both of the complaint conductive members 207, 211 may be attached to the second conductive display cowling 202-2, instead of to the circuit cowling 203 (or other component of the main assembly 107). As described herein, compliant conductive members may be attached to a component via an electrically conductive adhesive, weld, solder, fastener, or using any other suitable technique or material that attaches the compliant conductive member to another component and establishes or allows a conductive coupling between the compliant conductive member and the other component.

Figure 7:
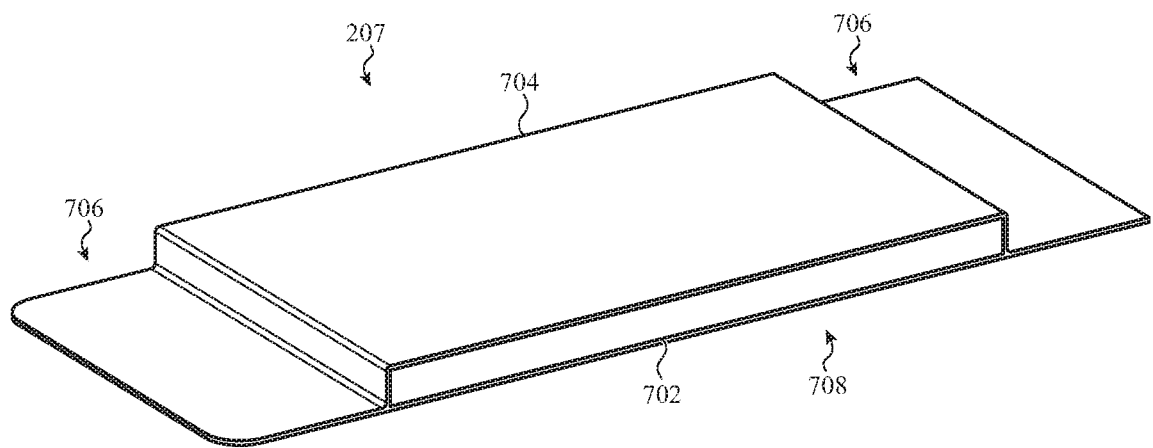
FIG. 7 depicts a compliant conductive member.

FIG. 7 illustrates an example of the compliant conductive member 207 (and/or the compliant conductive member 211). The compliant conductive member 207 may include a flexible conductive material 704 wrapped at least partially around a compliant material core 702. The flexible conductive material 704 may be a conductive fabric (which may include metal threads, filaments, wires, etc.), flexible metal (e.g., foil), or any other suitable material that is electrically conductive and capable of flexing and/or deforming when captured between two other components without damaging those components or becoming damaged itself. The compliant material core 702 may be a compliant material such as a foam, silicone, a spring, a polymer, or another compliant material or structure. The compliant material core 702 may be electrically conductive or non-conductive.

The combination of the compliant material core 702 and the flexible conductive material 704 allows the compliant conductive member 207 to maintain a positive conductive coupling between components that are otherwise separated by a gap, while accounting for possible differences in the size of the gap (e.g., due to manufacturing tolerances) as well as changes in the gap size of a device (e.g., due to temperature changes, component movement due to normal use, etc.). For example, when captured between a conductive display cowling and a circuit cowling, the compliant conductive member 207 may be deformed and/or compressed, causing at least the compliant material core 702 to produce a counteracting force which tends to bias the flexible conductive material 704 into contact with the conductive display cowling and the circuit cowling (or other components that may be in contact with the compliant conductive member 207).

The compliant conductive member 207 may be attached to a component, such as the circuit cowling 203, such that when the front cover assembly 105 is coupled to the main assembly 107, the compliant conductive member 207 is properly positioned to be contacted by another component, such as the conductive display cowling 202-2. The compliant conductive member 207 may be attached via an electrically conductive adhesive, or via a weld (e.g., welding the flexible conductive material 704 to another component). In some cases, the compliant conductive member 207 includes wing portions 706, which may be formed of the flexible conductive material 704. The wing portions 706 may be attached to a component via a conductive or nonconductive adhesive, fasteners, clips, or the like. Where the wing portions 706 are attached via a non-conductive or insulating material, such as a non-conductive adhesive, the central portion 708 of the flexible conductive material 704 (between the wing portions 706) may contact the component to which the compliant conductive member 207 is attached, thereby conductively coupling the component and the compliant conductive member 207.

Figure 8:
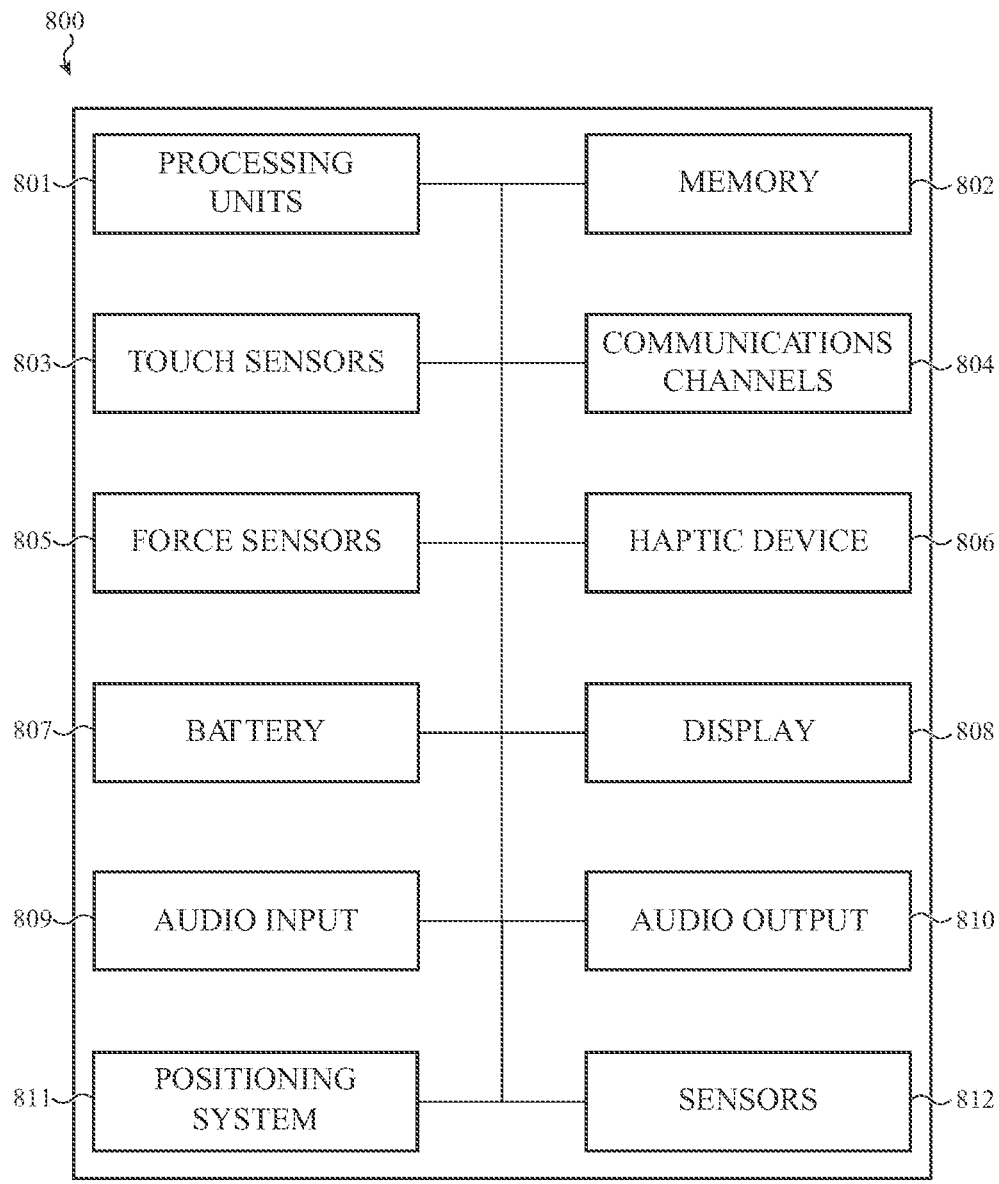
FIG. 8 depicts a schematic diagram of an example electronic device.

FIG. 8 depicts an example schematic diagram of an electronic device 800. The electronic device 800 may be an embodiment of or otherwise represent the device 100. The device 800 includes one or more processing units 801 that are configured to access a memory 802 having instructions stored thereon. The instructions or computer programs may be configured to perform one or more of the operations or functions described with respect to the electronic devices described herein. For example, the instructions may be configured to control or coordinate the operation of one or more displays 808, one or more touch sensors 803, one or more force sensors 805, one or more communication channels 804, one or more audio input systems 809, one or more audio output systems 810, one or more positioning systems 811, one or more sensors 812, and/or one or more haptic feedback devices 806.

The processing units 801 of FIG. 8 may be implemented as any electronic device capable of processing, receiving, or transmitting data or instructions. For example, the processing units 801 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 801 may be coupled to a circuit board assembly, such as the circuit board assembly 208, FIG. 2.

The memory 802 can store electronic data that can be used by the device 800. For example, a memory can store electrical data or content such as, for example, audio and video files, images, documents and applications, device settings and user preferences, programs, instructions, timing and control signals or data for the various modules, data structures or databases, and so on. The memory 802 can be configured as any type of memory. By way of example only, the memory can be implemented as random access memory, read-only memory, Flash memory, removable memory, or other types of storage elements, or combinations of such devices. The memory 802 may be coupled to a circuit board assembly, such as the circuit board assembly 208, FIG. 2.

The touch sensors 803 may detect various types of touch-based inputs and generate signals or data that are able to be accessed using processor instructions. The touch sensors 803 may use any suitable components and may rely on any suitable phenomena to detect physical inputs. For example, the touch sensors 803 may be capacitive touch sensors, resistive touch sensors, acoustic wave sensors, or the like. The touch sensors 803 may include any suitable components for detecting touch-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 803 may be integrated with or otherwise configured to detect touch inputs applied to any portion of the device 800. For example, the touch sensors 803 may be configured to detect touch inputs applied to any portion of the device 800 that includes a display (and may be integrated with a display). The touch sensors 803 may operate in conjunction with the force sensors 805 to generate signals or data in response to touch inputs. A touch sensor or force sensor that is positioned over a display surface or otherwise integrated with a display may be referred to herein as a touch-sensitive display, a force-sensitive display, or a touchscreen.

The force sensors 805 may detect various types of force-based inputs and generate signals or data that are able to be accessed using processor instructions. The force sensors 805 may use any suitable components and may rely on any suitable phenomena to detect physical inputs. For example, the force sensors 805 may be strain-based sensors, piezoelectric-based sensors, piezoresistive-based sensors, capacitive sensors, resistive sensors, or the like. The force sensors 805 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 805 may be used in conjunction with various input mechanisms to detect various types of inputs. For example, the force sensors 805 may be used to detect presses or other force inputs that satisfy a force threshold (which may represent a more forceful input than is typical for a standard "touch" input). Like the touch sensors 803, the force sensors 805 may be integrated with or otherwise configured to detect force inputs applied to any portion of the device 800. For example, the force sensors 805 may be configured to detect force inputs applied to any portion of the device 800 that includes a display (and may be integrated with a display). The force sensors 805 may operate in conjunction with the touch sensors 803 to generate signals or data in response to touch- and/or force-based inputs.

The device 800 may also include one or more haptic devices 806 (e.g., the haptic actuator 214, FIG. 2). The haptic device 806 may include one or more of a variety of haptic technologies such as, but not necessarily limited to, rotational haptic devices, linear actuators, piezoelectric devices, vibration elements, and so on. In general, the haptic device 806 may be configured to provide punctuated and distinct feedback to a user of the device. More particularly, the haptic device 806 may be adapted to produce a knock or tap sensation and/or a vibration sensation. Such haptic outputs may be provided in response to detection of touch and/or force inputs, and may be imparted to a user through the exterior surface of the device 800 (e.g., via a glass or other surface that acts as a touch- and/or force-sensitive display or surface).

The one or more communication channels 804 may include one or more wireless interface(s) that are adapted to provide communication between the processing unit(s) 801 and an external device. The one or more communication channels 804 may include antennas (e.g., antennas that include or use the housing members of the housing 104 as radiating members), communications circuitry, firmware, software, or any other components or systems that facilitate wireless communications with other devices. In general, the one or more communication channels 804 may be configured to transmit and receive data and/or signals that may be interpreted by instructions executed on the processing units 801. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communications channels 804 may also include ultra-wideband (UWB) interfaces, which may include any appropriate communications circuitry, instructions, and number and position of suitable UWB antennas.

As shown in FIG. 8, the device 800 may include a battery 807 that is used to store and provide power to the other components of the device 800. The battery 807 may be a rechargeable power supply that is configured to provide power to the device 800. The battery 807 may be coupled to charging systems (e.g., wired and/or wireless charging systems) and/or other circuitry to control the electrical power provided to the battery 807 and to control the electrical power provided from the battery 807 to the device 800. The battery 807 may represent the battery 210, FIG. 2.

The device 800 may also include one or more displays 808 configured to display graphical outputs. The displays 808 may use any suitable display technology, including liquid crystal displays (LCD), organic light emitting diodes (OLED), active-matrix organic light-emitting diode displays (AMOLED), or the like. The displays 808 may display graphical user interfaces, images, icons, or any other suitable graphical outputs.

The device 800 may also provide audio input functionality via one or more audio input systems 809. The audio input systems 809 may include microphones, transducers, or other devices that capture sound for voice calls, video calls, audio recordings, video recordings, voice commands, and the like.

The device 800 may also provide audio output functionality via one or more audio output systems (e.g., speakers) 810, such as the speaker system 216 (FIG. 2). The audio output systems 810 may produce sound from voice calls, video calls, streaming or local audio content, streaming or local video content, or the like.

The device 800 may also include a positioning system 811. The positioning system 811 may be configured to determine the location of the device 800. For example, the positioning system 811 may include magnetometers, gyroscopes, accelerometers, optical sensors, cameras, global positioning system (GPS) receivers, inertial positioning systems, or the like. The positioning system 811 may be used to determine spatial parameters of the device 800, such as the location of the device 800 (e.g., geographical coordinates of the device), measurements or estimates of physical movement of the device 800, an orientation of the device 800, or the like.

The device 800 may also include one or more additional sensors 812 to receive inputs (e.g., from a user or another computer, device, system, network, etc.) or to detect any suitable property or parameter of the device, the environment surrounding the device, people or things interacting with the device (or nearby the device), or the like. For example, a device may include temperature sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 8 are disclosed as being part of, incorporated into, or performed by the device 800, it should be understood that various embodiments may omit any or all such described functionalities, operations, and structures. Thus, different embodiments of the device 800 may have some, none, or all of the various capabilities, apparatuses, physical features, modes, and operating parameters discussed herein. Further, the systems included in the device 800 are not exclusive, and the device 800 may include alternative or additional systems, components, modules, programs, instructions, or the like, that may be necessary or useful to perform the functions described herein.

As described above, one aspect of the present technology is the gathering and use of data available from various sources to improve the usefulness and functionality of devices such as mobile phones. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to locate devices, deliver targeted content that is of greater interest to the user, or the like. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the figure being referred to, unless an absolute horizontal or vertical orientation is indicated.

Features, structures, configurations, components, techniques, etc. shown or described with respect to any given figure (or otherwise described in the application) may be used with features, structures, configurations, components, techniques, etc. described with respect to other figures. For example, any given figure of the instant application should not be understood to be limited to only those features, structures, configurations, components, techniques, etc. shown in that particular figure. Similarly, features, structures, configurations, components, techniques, etc. shown only in different figures may be used or implemented together. Further, features, structures, configurations, components, techniques, etc. that are shown or described together may be implemented separately and/or combined with other features, structures, configurations, components, techniques, etc. from other figures or portions of the instant specification. Further, for ease of illustration and explanation, figures of the instant application may depict certain components and/or sub-assemblies in isolation from other components and/or sub-assemblies of an electronic device, though it will be understood that components and sub-assemblies that are illustrated in isolation may in some cases be considered different portions of a single electronic device (e.g., a single embodiment that includes multiple of the illustrated components and/or sub-assemblies).

What is claimed is:

1. A mobile phone comprising:
   a housing structure;
   a front cover assembly coupled to the housing structure and comprising:
   a transparent cover defining at least a portion of a front exterior surface of the mobile phone; and
   a display assembly coupled to the transparent cover and comprising:
   a display element configured to produce graphical outputs visible through the transparent cover;
   a first conductive display cowling below a first region of the display element; and
   a second conductive display cowling below a second region of the display element and spaced apart from the first conductive display cowling, thereby forming a gap between the first conductive display cowling and the second conductive display cowling;

a battery positioned below the gap;

a circuit board assembly positioned below the front cover assembly; and a back cover coupled to the housing structure and defining at least a portion of a back exterior surface of the mobile phone.

2. The mobile phone of claim 1, wherein:
the front cover assembly further includes a mounting frame;
the first conductive display cowling is fastened to the mounting frame, thereby structurally and conductively coupling the first conductive display cowling to the mounting frame;
the second conductive display cowling is fastened to the mounting frame, thereby structurally and conductively coupling the second conductive display cowling to the mounting frame; and
the first conductive display cowling, the second conductive display cowling, and the mounting frame are conductively coupled to a system ground of the mobile phone.

3. The mobile phone of claim 2, wherein the mounting frame conductively couples the first conductive display cowling to the second conductive display cowling.

4. The mobile phone of claim 1, wherein:
the gap is a first gap; and
a second gap is defined between a top surface of the battery and a bottom surface of the display element.

5. The mobile phone of claim 4, wherein the display assembly further comprises a graphite layer defining at least a portion of the bottom surface of the display element.

6. The mobile phone of claim 1, wherein:
the gap is a first gap;
a second gap is defined between a top surface of the circuit board assembly and a bottom surface of the display element; and
the circuit board assembly comprises a graphite layer defining at least a portion of the top surface of the circuit board assembly.

7. The mobile phone of claim 1, wherein:
the display element comprises a flexible circuit element extending from a side of the display element and conductively coupled to the circuit board assembly; and
a portion of the flexible circuit element is captured between the second conductive display cowling and a bottom surface of the display element.

8. The mobile phone of claim 1, wherein:
the gap extends along an axis from an edge of the first conductive display cowling to an edge of the second conductive display cowling;
the battery is spaced apart from the edge of the first conductive display cowling along the axis; and
the battery is spaced apart from the edge of the second conductive display cowling along the axis.

9. The mobile phone of claim 1, wherein an entirety of the battery is positioned below the gap.

10. A mobile phone comprising:
a housing structure defining at least a portion of a side exterior surface of the mobile phone;
a transparent cover coupled to the housing structure and defining at least a portion of a front exterior surface of the mobile phone;
a display element coupled to the transparent cover and configured to produce graphical outputs visible through the transparent cover;
a battery positioned below the display element and defining a top surface facing a bottom surface of the display element;
a first conductive display cowling coupled to the transparent cover along an upper region of the display element and non-overlapping with the top surface of the battery; and
a second conductive display cowling coupled to the transparent cover along a lower region of the display element and non-overlapping with the top surface of the battery.

11. The mobile phone of claim 10, wherein:
the mobile phone further comprises a conductive component coupled to the housing structure and conductively coupled to a system ground of the mobile phone; and
the second conductive display cowling is conductively coupled to the conductive component, thereby conductively coupling the second conductive display cowling to the system ground.

12. The mobile phone of claim 11, further comprising a compliant conductive member positioned between the conductive component and the second conductive display cowling and conductively coupling the conductive component to the second conductive display cowling.

13. The mobile phone of claim 12, wherein the compliant conductive member comprises:
a foam core; and
a conductive fabric extending around the foam core.

14. The mobile phone of claim 10, further comprising a mounting frame coupled to the transparent cover and configured to retain the transparent cover to the housing structure.

15. The mobile phone of claim 14, wherein:
the first conductive display cowling is conductively coupled to the mounting frame;
the second conductive display cowling is conductively coupled to the mounting frame; and
the first conductive display cowling, the second conductive display cowling, and the mounting frame are conductively coupled to a system ground of the mobile phone.

16. The mobile phone of claim 14, wherein:
the mobile phone further comprises a polymer structure attached to the transparent cover; and
the mounting frame comprises a metal structure at least partially embedded in the polymer structure.

17. A mobile phone comprising:
a housing structure at least partially defining an interior volume;
a front cover assembly coupled to the housing structure and comprising:
a transparent cover;
a display element configured to produce graphical outputs visible through the transparent cover;
a first conductive structure overlapping a first region of a bottom surface of the display element and defining a first conductive path between the front cover assembly and a system ground of the mobile phone; and
a second conductive structure overlapping a second region of the bottom surface of the display element and defining a second conductive path between the front cover assembly and the system ground of the mobile phone; and a battery coupled to the housing structure and positioned below a third region of the display element, the third region between the first region of the display element and the second region of the display element.

18. The mobile phone of claim 17, wherein a top surface of the battery is positioned across a gap from the bottom surface of the display element.

19. The mobile phone of claim 18, wherein the display element comprises a graphite layer defining at least a portion of the bottom surface of the display element.

20. The mobile phone of claim 17, wherein:
the mobile phone further comprises a circuit board assembly coupled to the housing structure; and
a portion of a top surface of the circuit board assembly is positioned across a gap from the bottom surface of the display element.

21. The mobile phone of claim 20, wherein the circuit board assembly comprises a graphite layer defining at least the portion of the top surface of the circuit board assembly.

22. The mobile phone of claim 17, wherein:
the first conductive structure is a first conductive display cowling that does not overlap the battery; and
the second conductive structure is a second conductive display cowling that does not overlap the battery.

23. A mobile phone comprising:
a housing structure;
a battery;
a front cover assembly coupled to the housing structure and positioned over the battery, the front cover assembly comprising:
 a transparent cover defining at least a portion of a front exterior surface of the mobile phone; and
 a display assembly coupled to the transparent cover and comprising:
  a display element configured to produce graphical outputs visible through the transparent cover;
  a first conductive display cowling below a first region of the display element and positioned outside of an outer periphery of the battery; and
  a second conductive display cowling below a second region of the display element and positioned outside of the outer periphery of the battery;
a circuit board assembly positioned below the front cover assembly; and
a back cover coupled to the housing structure and defining at least a portion of a back exterior surface of the mobile phone.

* * * * *